(12) United States Patent
Vlachos et al.

(10) Patent No.: US 12,403,455 B2
(45) Date of Patent: Sep. 2, 2025

(54) CATALYTIC HYDROCONVERSION OF POLYPROPYLENE-BASED PLASTIC WASTE TO LUBRICANT BASE-OILS

(71) Applicant: University of Delaware, Newark, DE (US)

(72) Inventors: Dionisios G. Vlachos, Newark, DE (US); Sibao Liu, Tianjin (CN); Brandon Vance, Newark, DE (US); Cong Wang, Glenn Mills, PA (US); Pavel Kots, Philadelphia, PA (US)

(73) Assignee: University of Delaware, Newark, DE (US)

( * ) Notice: Subject to any disclaimer, the term of this patent is extended or adjusted under 35 U.S.C. 154(b) by 181 days.

(21) Appl. No.: 18/281,349

(22) PCT Filed: Mar. 10, 2022

(86) PCT No.: PCT/US2022/019667
§ 371 (c)(1),
(2) Date: Sep. 11, 2023

(87) PCT Pub. No.: WO2022/192484
PCT Pub. Date: Sep. 15, 2022

(65) Prior Publication Data
US 2024/0165590 A1 May 23, 2024

Related U.S. Application Data

(60) Provisional application No. 63/160,024, filed on Mar. 12, 2021.

(51) Int. Cl.
*B01J 23/46* (2006.01)
*B01J 21/06* (2006.01)
(Continued)

(52) U.S. Cl.
CPC .......... *B01J 23/462* (2013.01); *B01J 21/063* (2013.01); *B01J 21/08* (2013.01); *B01J 21/18* (2013.01);
(Continued)

(58) Field of Classification Search
CPC ........ B01J 23/462; B01J 21/063; B01J 21/08; B01J 21/18; B01J 23/10; B01J 23/75;
(Continued)

(56) References Cited

U.S. PATENT DOCUMENTS 6,171,475 B1 * 1/2001 Dufaud .................. C10G 1/10
208/111.1
8,664,458 B2 * 3/2014 Kumar .................... C08J 11/16
201/21
(Continued)

OTHER PUBLICATIONS

International Search Report based on co-pending International Application No. PCT/US2022/019667, dated Sep. 6, 2022, pp. 1-5.
(Continued)

*Primary Examiner* — Ali Z Fadhel
(74) *Attorney, Agent, or Firm* — McCarter & English, LLP

(57) ABSTRACT

The present disclosure provides a process for converting plastic comprising a polyolefin polymer to a lubricant. The process comprises contacting the plastic with a catalyst represented by $A/[R_mQ_n]$.

27 Claims, 28 Drawing Sheets

(51) Int. Cl.

| | |
|---|---|
| *B01J 21/08* | (2006.01) |
| *B01J 21/18* | (2006.01) |
| *B01J 23/10* | (2006.01) |
| *B01J 23/75* | (2006.01) |
| *B01J 23/755* | (2006.01) |
| *B01J 23/94* | (2006.01) |
| *B01J 23/96* | (2006.01) |
| *B01J 37/02* | (2006.01) |
| *B01J 37/18* | (2006.01) |
| *B01J 38/02* | (2006.01) |
| *B01J 38/10* | (2006.01) |
| *C10G 1/06* | (2006.01) |
| *C10G 1/10* | (2006.01) |
| *C10M 105/04* | (2006.01) |
| *C10M 177/00* | (2006.01) |
| *C10N 70/00* | (2006.01) |

(52) U.S. Cl.
CPC .............. *B01J 23/10* (2013.01); *B01J 23/75* (2013.01); *B01J 23/755* (2013.01); *B01J 23/94* (2013.01); *B01J 23/96* (2013.01); *B01J 37/0201* (2013.01); *B01J 37/18* (2013.01); *B01J 38/02* (2013.01); *B01J 38/10* (2013.01); *C10G 1/06* (2013.01); *C10G 1/10* (2013.01); *C10M 105/04* (2013.01); *C10M 177/00* (2013.01); *C10G 2300/1003* (2013.01); *C10M 2203/003* (2013.01); *C10N 2070/00* (2013.01)

(58) Field of Classification Search
CPC . B01J 23/755; B01J 23/94; B01J 23/96; B01J 37/0201; B01J 37/18; B01J 38/02; B01J 38/10; B01J 23/42; B01J 23/44; B01J 23/464; B01J 23/468; B01J 23/40; B01J 23/70; B01J 23/74; B01J 2235/05; B01J 2235/10; B01J 2235/15; B01J 2235/30; C10G 1/06; C10G 1/10; C10G 2300/1003; C10M 105/04; C10M 177/00; C10M 2203/003; C10M 171/00; C10M 2205/0225; C10M 2205/0245; C10N 2070/00

See application file for complete search history.

(56) References Cited

U.S. PATENT DOCUMENTS

| | | | | |
|---|---|---|---|---|
| 10,472,487 | B2* | 11/2019 | Gil | C10G 1/02 |
| 2005/0148487 | A1* | 7/2005 | Brownscombe | C10G 1/10 |
| | | | | 510/446 |
| 2009/0321317 | A1* | 12/2009 | Widmer | C10G 1/10 |
| | | | | 422/198 |
| 2013/0264246 | A1 | 10/2013 | Holtzer et al. | |
| 2015/0361374 | A1* | 12/2015 | Kumar | C08J 11/10 |
| | | | | 585/241 |
| 2017/0114283 | A1 | 4/2017 | Urade et al. | |
| 2020/0238269 | A1* | 7/2020 | Delferro | B01J 23/002 |
| 2021/0061971 | A1* | 3/2021 | Delferro | B01J 23/42 |
| 2022/0081638 | A1* | 3/2022 | Celik | B01J 35/23 |
| 2022/0111356 | A1* | 4/2022 | Sadow | B01J 23/42 |
| 2022/0213007 | A1* | 7/2022 | Sadow | B01J 21/12 |
| 2024/0132692 | A1* | 4/2024 | Manenti | C10B 53/07 |

OTHER PUBLICATIONS

Written Opinion based on co-pending International Application No. PCT/US2022/019667, dated Sep. 6, 2022, pp. 1-6.

International Preliminary Report on Patentability (IPRP), based on co-pending International Application No. PCT/US2022/019667, dated Sep. 12, 2023, pp. 1-6.

Rorrer, Julie E., et al., "Conversion of Polyolefin Waste to Liquid Alkanes with Ru-Based Catalysts under Mild Conditions", JACS AU, Jan. 25, 2021, vol. 1, No. 1, pp. 1-18.

Kots, Pavel A., et al., "Polypropylene Plastic Waste Conversion to Lubricants over Ru/TiO2 Catalysts", ACS Catalysis, Jun. 18, 2021, vol. 11, pp. 8104-8115.

* cited by examiner

CATALYTIC HYDROCONVERSION OF POLYPROPYLENE-BASED PLASTIC WASTE TO LUBRICANT BASE-OILS

CROSS REFERENCE TO RELATED APPLICATIONS

This application is a national stage application filed under 35 U.S.C. § 371 of PCT/US2022/019667, filed Mar. 10, 2022, which claims the benefit of U.S. Provisional Patent Application Ser. No. 63/160,024, filed Mar. 12, 2021, the contents of which are each herein incorporated by reference.

STATEMENT AS TO FEDERALLY SPONSORED RESEARCH

This invention was made with government support under grant DE-SC0021166 awarded by the Department of Energy. The government has certain rights in the invention.

BACKGROUND

Plastic production has experienced exponential growth in recent years, mainly due to the high demand for single-use packaging materials. The current pandemic restrictions spurred the need for food, pharmaceuticals, and cleaning packaging together with polymer-based protective equipment. Simultaneously, plastic waste has become a major threat to the environment due to the contamination of soil, oceans, and air. A vast amount of plastic waste accumulates in landfills due to being unsuitable for mechanical recycling. Despite the significant success in the recycling of polyethylene terephthalate (PET), a negligible percentage of high- or low-density polyethylene (HDPE or LDPE), as well as polypropylene (PP), is recycled. For instance, the world's most used plastic—PP—has a global production rate of $55 \times 10^6$ t/a with only 1% being recycled. Converting polyolefins to their respective monomers (ethylene or propylene) requires an enormous amount of energy due to unfavorable thermodynamics of C—C bond breaking making chemical recycling challenges.

Lately, the concept of upcycling polyolefin waste has been discussed extensively. Recent reports have shown that noble metal nanoparticles deposited on silica, alumina, ceria, or carbon in the presence of $H_2$ can easily break C—C bonds in the polyolefin backbone via hydrogenolysis producing low-molecular-weight wax or mainly smaller fuel-range hydrocarbons as fuels from polyolefin plastic waste. Ruthenium (Ru) is one of the most active d-metals for C—C bond hydrogenolysis of LDPE. One of the drawbacks of Ru-based catalysts, and other metals, is their strong tendency to break terminal C—C bonds forming low-value methane and other light alkanes. While exciting progress is rapidly being made, evaluation of product properties has not been conducted yet. LDPE hydrogenolysis products are essentially linear alkanes, a property limiting their use as fuels or lubricants. The long reaction times, high temperatures, high gas production, and low polymer to catalyst mass ratios, evidenced in recent reports, expose some of the challenges in polyolefin conversion and the need to discover more active and selective catalysts.

On the other side, lubricants represent a large $>37 \times 10^6$ t/a market driven by automotive engine oils, industrial metal-working fluids, and hydraulic oils. Nearly half of the lubricants are mineral base oils ($C_{20}$-$C_{60}$ isoalkanes), produced by mild hydrodewaxing of crude oil distillates.

Accordingly, there is a need for an improved catalytic technology that is energy-efficient, low-temperature, and high polymer to catalyst mass and therefore substantially reduces the environmental footprint of modern plastics and upcycles plastics into high-value products, i.e. lubricants.

SUMMARY DESCRIPTION

The present disclosure provides a process for converting plastic comprising a polyolefin polymer to a lubricant, comprising contacting the plastic with a catalyst represented by the Formula (I):

$$A/[R_mQ_n] \qquad (I),$$

at a temperature between about 200° C. and about 400° C.; wherein

A is a metal selected from a group consisting of ruthenium, rhodium, osmium, platinum, palladium, nickel, cobalt, tin, iron, copper, and a combination thereof;

$[R_mQ_n]$ is a supporting material; wherein

R is selected from a group consisting of carbon (C), silicon (Si), aluminum (Al), cerium (Ce), titanium (Ti), tungsten (W), zirconium (Zr), and a combination thereof;

Q is absent or oxygen;

m is 1, 2, or 3;

n is 1, 2, 3, or 4; and the symbol "/" means that the moiety A is deposited on the moiety $[R_mQ_n]$.

DETAILED DESCRIPTION

1. Processes of Present Disclosure

Figure 1:
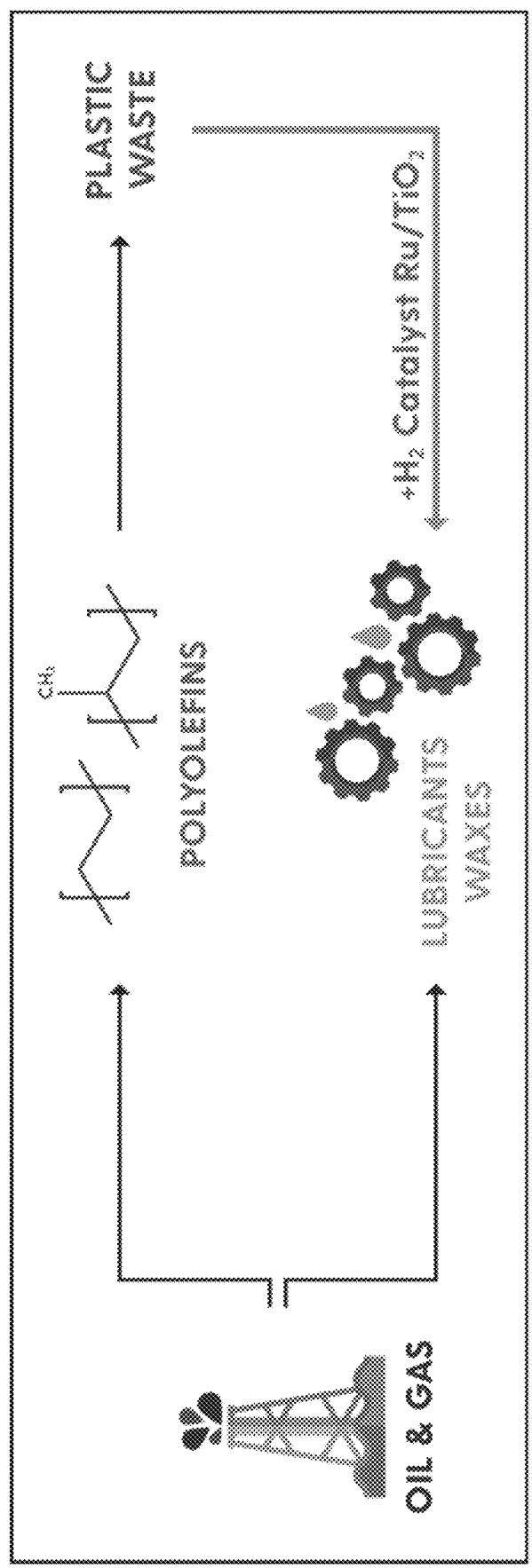
FIG. 1 shows upcycling of plastic waste via hydrogenolysis.

In a first embodiment, the present disclosure provides a process for converting plastic comprising a polyolefin polymer to a lubricant, comprising contacting the plastic with a catalyst represented by the Formula (I):

$$A/[R_mQ_n] \qquad (I),$$

at a temperature between about 200° C. and about 400° C.; wherein

A is a metal selected from a group consisting of ruthenium, rhodium, osmium, platinum, palladium, nickel, cobalt, tin, iron, copper, and a combination thereof;

R$_m$Q$_n$ is a supporting material; wherein

R is selected from a group consisting of carbon (C), silicon (Si), aluminum (Al), cerium (Ce), titanium (Ti), tungsten (W), zirconium (Zr), and a combination thereof;

Q is absent or oxygen;

m is 1, 2, or 3;

n is 1, 2, 3, or 4; and the symbol "/" means that the moiety A is deposited on the moiety [R$_m$Q$_n$].

In a second embodiment, the present disclosure provides a process according to the first embodiment, wherein the plastic comprises a homopolymer of an olefin, a copolymer of olefins, or a mixture thereof. The definitions of the remaining variables are provided in the first embodiment and the other embodiments described herein.

In a third embodiment, the present disclosure provides a process according to the first embodiment or second embodiment, wherein the plastic comprises polyethylene, polypropylene, polybutene, polyisobutylene, polypentene, polyhexene, polyoctene, polystyrene, or a mixture thereof. In one embodiment, the plastic comprises polyethylene, polypropylene, polystyrene, or a mixture thereof. In one embodiment, the polyethylene comprises high-density polyethylene, a polyethylene bottle, or a mixture thereof. The definitions of the remaining variables are provided in the first embodiment or the second embodiment and the other embodiments described herein.

In a fourth embodiment, the present disclosure provides a process according to any one of the first through third embodiments, wherein the plastic comprises high-density polyethylene (HDPE), low-density polyethylene (LDPE), polypropylene (PP), polystyrene (PS), or a mixture thereof. The definitions of the remaining variables are provided in any one of the first through third embodiment and the other embodiments described herein.

In a fifth embodiment, the present disclosure provides a process according to any one of the first through fourth embodiments, wherein the plastic comprises polypropylene. The definitions of the remaining variables are provided in any one of the first through fourth embodiments and the other embodiments described herein.

In a sixth embodiment, the present disclosure provides a process according to any one of the first through fifth embodiments, wherein the plastic is selected from the group consisting of isotactic polypropylene, syndiotactic polypropylene, atactic polypropylene, low molecular weight isotactic polypropylene, amorphous polypropylene, polypropylene bottles, polypropylene transparent bags, and a mixture thereof. The definitions of the remaining variables are provided in any one of the first through fifth embodiments and the other embodiments described herein.

In a seventh embodiment, the present disclosure provides a process according to any one of the first through sixth embodiments, wherein the plastic is selected from the group consisting of isotactic polypropylene, low molecular weight isotactic polypropylene, amorphous polypropylene, polypropylene bottles, polypropylene transparent bags, and a mixture thereof. The definitions of the remaining variables are provided in any one of the first through sixth embodiments and the other embodiments described herein.

In an eighth embodiment, the present disclosure provides a process according to any one of the first through seventh embodiments, wherein the process is carried out in a hydrogen atmosphere. The definitions of the remaining variables are provided in any one of the first through seventh embodiments and the other embodiments described herein.

In a ninth embodiment, the present disclosure provides a process according to the eighth embodiment, wherein the hydrogen atmosphere is at a pressure between about 20 bar to about 200 bar. The definitions of the remaining variables are provided in the eighth embodiment or the other embodiments described herein. In one embodiment, the hydrogen atmosphere is at a pressure between about 20 bar to about 190 bar, about 20 bar to about 180 bar, about 20 bar to about 170 bar, about 20 bar to about 160 bar, about 20 bar to about 150 bar, about 20 bar to about 140 bar, about 20 bar to about 130 bar, about 20 bar to about 120 bar, about 20 bar to about 110 bar, about 20 bar to about 100 bar, about 20 bar to about 90 bar, about 20 bar to about 80 bar, about 20 bar to about 70 bar, about 20 bar to about 60 bar, about 20 bar to about 50 bar, about 20 bar to about 40 bar, about 20 bar to about 30 bar, about 30 bar to about 40 bar, 40 bar to about 50 bar, 50 bar to about 60 bar, 60 bar to about 70 bar, 70 bar to about 80 bar, 80 bar to about 90 bar, 90 bar to about 100 bar, 100 bar to about 110 bar, 110 bar to about 120 bar, 120 bar to about 130 bar, 130 bar to about 140 bar, 140 bar to about 150 bar, 150 bar to about 160 bar, 170 bar to about 180 bar, 180 bar to about 190 bar, or 190 bar to about 200 bar. In one embodiment, the hydrogen atmosphere is at a pressure of about 20 bar, about 25 bar, about 30 bar, about 35 bar, about 40 bar, about 45 bar, about 50 bar, about 55 bar, about 60 bar, about 65 bar, about 70 bar, about 75 bar, about 80 bar, about 85 bar, about 90 bar, about 95 bar, about 100 bar, about 105 bar, about 110 bar, about 115 bar, about 120 bar, about 125 bar, about 130 bar, about 135 bar, about 140 bar, about 145 bar, about 150 bar, about 155 bar, about 160 bar, about 165 bar, about 170 bar, about 175 bar, about 180 bar, about 185 bar, about 190 bar, about 195 bar, or about 200 bar.

In a tenth embodiment, the present disclosure provides a process according to the eighth or ninth embodiments, wherein the hydrogen atmosphere is at a pressure between about 20 bar to about 100 bar. The definitions of the remaining variables are provided in the eighth or ninth embodiment and the other embodiments described herein.

In an eleventh embodiment, the present disclosure provides a process according to any one of the eighth through tenth embodiments, wherein the hydrogen atmosphere is at a pressure between about 20 bar to about 40 bar. The definitions of the remaining variables are provided in any one of the eighth through tenth embodiments and the other embodiments described herein.

In a twelfth embodiment, the present disclosure provides a process according to any one of the eighth through eleventh embodiments, wherein the hydrogen atmosphere is at a pressure of about 30 bar. The definitions of the remaining variables are provided in any one of the eighth through eleventh embodiments and the other embodiments described herein.

In a thirteenth embodiment, the present disclosure provides a process according to any one of the first through twelfth embodiments, wherein the temperature is between about 200° C. and about 325° C. The definitions of the remaining variables are provided in any one of the first through eleventh embodiments and the other embodiments described herein. In one embodiment, the temperature is between about 200° C. and about 320° C., about 200° C. and about 315° C., about 200° C. and about 310° C., about 200° C. and about 305° C., about 200° C. and about 300° C., about 200° C. and about 290° C., about 200° C. and about 280° C., about 200° C. and about 270° C., about 200° C. and about 260° C., about 200° C. and about 250° C., about 200° C. and about 240° C., about 200° C. and about 230° C., about 200° C. and about 220° C., or about 200° C. and about 210° C. In one embodiment, the temperature is about 200° C., about 205° C., about 210° C., about 215° C., about 220° C., about 225° C., about 230° C., about 235° C., about 240° C., about 250° C., about 260° C., about 270° C., about 280° C., about 290° C., about 300° C., about 310° C., or about 320° C.

In a fourteenth embodiment, the present disclosure provides a process according to any one of the first through thirteenth embodiments, wherein the temperature is between about 225° C. and about 320° C. The definitions of the remaining variables are provided in any one of the first through thirteenth embodiments and the other embodiments described herein.

In a fifteenth embodiment, the present disclosure provides a process according to any one of the first through fourteenth embodiments, wherein the temperature is about 220° C., about 250° C., about 270° C., about 300° C., or about 320° C. The definitions of the remaining variables are provided in any one of the first through fourteenth embodiments and the other embodiments described herein.

In a sixteenth embodiment, the present disclosure provides a process according to any one of the first through fifteenth embodiments, wherein the process for conversion is carried out for a period of time between about 0.1 hour and about 96 hours. The definitions of the remaining variables are provided in any one of the first through fifteenth embodiments and the other embodiments described herein. In one embodiment, the period of time is between about 0.2 hour and about 90 hours, about 0.3 hour and about 84 hours, about 0.4 hour and about 78 hours, about 0.5 hour and about 72 hours, about 0.5 hour and about 66 hours, about 0.5 hour and about 60 hours, about 0.5 hour and about 54 hours, about 0.5 hour and about 48 hours, about 0.5 hour and about 42 hours, about 0.5 hour and about 36 hours, about 0.5 hour and about 30 hours, about 0.5 hour and about 24 hours, about 0.5 hour and about 18 hours, about 0.5 hour and about 12 hours, about 0.5 hour and about 10 hours, about 0.5 hour and about 8 hours, about 0.5 hour and about 6 hours, about 0.5 hour and about 4 hours, about 0.5 hour and about 2 hours, or about 0.5 hour and about 1 hour. In one embodiment, the period of time is about 0.1 hour, about 0.2 hour, about 0.3 hour, about 0.4 hour, about 0.5 hour, about 1.0 hour, about 2 hours, about 4 hours, about 6 hours, about 8 hours, about 10 hours, about 12 hours, about 14 hours, about 16 hours, about 18 hours, about 20 hours, about 22 hours, about 24 hours, about 26 hours, about 28 hours, about 30 hours, about 32 hours, about 34 hours, about 36 hours, about 38 hours, about 40 hours, about 42 hours, about 44 hours, about 46 hours, about 48 hours, about 50 hours, about 52 hours, about 54 hours, about 56 hours, about 58 hours, about 60 hours, about 62 hours, about 64 hours, about 66 hours, about 68 hours, about 70 hours, about 72 hours, about 74 hours, about 76 hours, about 78 hours, about 80 hours, about 82 hours, about 84 hours, about 86 hours, about 88 hours, about 90 hours, about 92 hours, about 94 hours, or about 96 hours.

In a seventeenth embodiment, the present disclosure provides a process according to the sixteenth embodiment, wherein the period of time is between about 0.5 hour and about 72 hours. The definitions of the remaining variables are provided in the sixteenth embodiment and the other embodiments described herein.

In an eighteenth embodiment, the present disclosure provides a process according to the sixteenth embodiment or the seventeenth embodiment, wherein the period of time is between about 1 hours and about 48 hours. The definitions of the remaining variables are provided in the sixteenth embodiment or the seventeenth embodiment and the other embodiments described herein.

In a nineteenth embodiment, the present disclosure provides a process according to any one of the sixteenth through eighteenth embodiments, wherein the period of time is between about 2 hours and about 24 hours. The definitions of the remaining variables are provided in any one of the sixteenth through eighteenth embodiments and the other embodiments described herein.

In a twentieth embodiment, the present disclosure provides a process according to any one of the sixteenth through nineteenth embodiments, wherein the period of time is about 2 hours, 3 hours, 5 hours, 6 hours, 12 hours, 16 hours, or 20 hours. The definitions of the remaining variables are provided in any one of the sixteenth through nineteenth embodiments and the other embodiments described herein.

In a twenty-first embodiment, the present disclosure provides a process according to any one of the first through twentieth embodiments, wherein the lubricant is a mixture of hydrocarbons having a carbon number distribution between about 13 and about 60. The definitions of the remaining variables are provided in the first through twentieth embodiments and the other embodiments described herein. In one embodiment, the lubricant is a mixture of hydrocarbons having a carbon number distribution between about 13 and about 58, about 13 and about 56, about 13 and about 54, about 13 and about 52, about 13 and about 50, about 13 and about 48, about 13 and about 46, about 13 and about 44, about 13 and about 42, about 13 and about 40, about 13 and about 38, about 13 and about 36, about 13 and about 34, about 13 and about 32, about 13 and about 30, about 13 and about 28, about 13 and about 26, about 13 and about 24, about 13 and about 22, about 13 and about 20, about 13 and about 18, about 13 and about 16, or about 13 and about 14. In one embodiment, the lubricant is a mixture of hydrocarbons having a carbon number distribution of about 13, about 15, about 17, about 19, about 21, about 23, about 25, about 27, about 29, about 31, about 33, about 35, about 37, about 39, about 41, about 43, about 45, about 47, about 49, about 51, about 53, about 55, about 57, or about 59.

In a twenty-second embodiment, the present disclosure provides a process according to any one of the first through twenty-first embodiments, wherein the lubricant is a mixture of hydrocarbons having a carbon number distribution between about 20 and about 60. The definitions of the remaining variables are provided in any one of the first through twenty-first embodiments and the other embodiments described herein.

In a twenty-third embodiment, the present disclosure provides a process according to any one of the first through twenty-second embodiments, wherein the lubricant comprises light lubricant oil, heavy lubricant oil, or a mixture of thereof. The definitions of the remaining variables are provided in the first through twenty-second embodiments and the other embodiments described herein.

In a twenty-fourth embodiment, the present disclosure provides a process according to any one of the first through twenty-third embodiments, wherein the KV40 value of the lubricant is between about 30 and about 115. The definitions of the remaining variables are provided in any one of the first through twenty-third embodiments and the other embodiments described herein. In one embodiment, the KV40 value of the lubricant is between about 30 and about 110, between about 30 and about 100, between about 30 and about 90, between about 30 and about 80, between about 30 and about 70, between about 30 and about 60, between about 30 and about 50, or between about 30 and about 40. In one embodiment, the KV40 value of the lubricant is about 30, about 40, about 50, about 60, about 70, about 80, about 90, about 100, about 110, or about 115.

In a twenty-fifth embodiment, the present disclosure provides a process according to any one of the first through twenty-fourth embodiments, wherein the KV100 value of the lubricant is between about 6 and about 45. The definitions of the remaining variables are provided in any one of the first through twenty-fourth embodiments and the other embodiments described herein. In one embodiment, the KV100 value of the lubricant is between about 6 and about 40, about 6 and about 35, about 6 and about 30, about 6 and about 25, about 6 and about 20, about 6 and about 15, or about 6 and about 10. In one embodiment, the KV100 value of the lubricant is about 6, about 10, about 15, about 20, about 25, about 30, about 35, about 40, or about 45.

In a twenty-sixth embodiment, the present disclosure provides a process according to any one of the first through twenty-fifth embodiments, wherein the viscosity index ("VI") value of the lubricant is between about 139 and about 156. The definitions of the remaining variables are provided in any one of the first through twenty-fifth embodiments and the other embodiments described herein. In one embodiment, the VI value of the lubricant is between about 139 and about 156, about 142 and about 156, about 144 and about 156, about 146 and about 156, about 148 and about 156, about 150 and about 156, about 152 and about 156, or about 154 and about 156. In one embodiment, the VI value of the lubricant is about 139, about 142, about 144, about 146, about 148, about 150, about 152, about 154, or about 156.

In a twenty-seventh embodiment, the present disclosure provides a process according to any one of the first through twenty-sixth embodiments, wherein the pour point of the lubricant is between about −15° C. and about −18° C. The definitions of the remaining variables are provided in the first through twenty-sixth embodiments and the other embodiments described herein. In one embodiment, the pour point of the lubricant is about −15° C., about −16° C., about −17° C., or about −18° C.

In a twenty-eighth embodiment, the present disclosure provides a process according to any one of the first through twenty-seventh embodiments, wherein the DSC oxidation onset temperature of the lubricant is between about 175° C. and about 179° C. The definitions of the remaining variables are provided in any one of the first through twenty-seventh embodiments and the other embodiments described herein. In one embodiment, the DSC oxidation onset temperature of the lubricant is about 175° C., about 176° C., about 177° C., about 178° C., or about 179° C.

In a twenty-ninth embodiment, the present disclosure provides a process according to any one of the first through twenty-eighth embodiments, wherein the number average molecular weight ($M_n$) of the lubricant is between about 600 and about 3,500. The definitions of the remaining variables are provided in any one of the first through twenty-eighth embodiments and the other embodiments described herein. In one embodiment, the number average molecular weight of the lubricant is between about 600 and about 3,250, about 600 and about 3,000, about 600 and about 2,750, about 600 and about 2,500, about 600 and about 2,250, about 600 and about 2,000, about 600 and about 1,750, about 600 and about 1,500, about 600 and about 1,250, about 600 and about 1,000, or about 600 and about 750. In one embodiment, the $M_n$ of the lubricant is about 600, about 800, about 1,000, about 1,200, about 1,400, about 1,600, about 1,800, about 2,000, about 2,200, about 2,400, about 2,600, about 2,800, about 3,000, or about 3,200.

In a thirtieth embodiment, the present disclosure provides a process according to any one of the first through twenty-ninth embodiments, wherein the weight average molecular weight ($M_w$) of the lubricant is between about 900 and about 9,000. The definitions of the remaining variables are provided in any one of the first through twenty-ninth embodiments and the other embodiments described herein. In one embodiment, the weight average molecular weight of the lubricant is between about 900 and about 8,500, about 900 and about 8,000, about 900 and about 7,500, about 900 and about 7,000, about 900 and about 6,500, about 900 and about 6,000, about 900 and about 5,500, about 900 and about 5,000, about 900 and about 4,500, about 900 and about 4,000, about 900 and about 3,500, about 900 and about 3,000, about 900 and about 2,500, about 900 and about 2,000, about 900 and about 1,500, or about 900 and about 1,000. In one embodiment, the weight average molecular weight of the lubricant is about 900, about 1,000, about 1,500, about 2,000, about 2,500, about 3,000, about 3,500, about 4,000, about 4,500, about 5,000, about 5,500, about 6,000, about 6,500, about 7,000, about 7,500, about 8,000, about 8,500, or about 9,000.

In a thirty-first embodiment, the present disclosure provides a process according to any one of the first through thirtieth embodiments, wherein the polydispersity index ("PDI") of the lubricant is between about 1.3 and about 2.8. The definitions of the remaining variables are provided in any one of the first through thirtieth embodiments and other embodiments described herein. In one embodiment, the polydispersity index of the lubricant is about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, or about 2.8.

In a thirty-second embodiment, the present disclosure provides a process according to any one of the first through thirty-first embodiment, wherein the viscosity at 100° C. of the lubricant is between about 6.2 and about 42.2. The definitions of the remaining variables are provided in any one of the first through thirty-first embodiments and other embodiments described herein. In one embodiment, the viscosity at 100° C. of the lubricant is between about 6.2 and about 42.2, about 10 and about 40, about 10 and about 35, about 10 and about 30, about 10 and about 25, about 10 and about 20, or about 10 and about 15. In one embodiment, the viscosity at 100° C. of the lubricant is about 6.2, about 10, about 15, about 20, about 25, about 30, about 35, or about 40.

In a thirty-third embodiment, the present disclosure provides a process according to any one of the first through thirty-second embodiments, wherein the molecular weight of the lubricant is between about 700 and about 800. The definitions of the remaining variables are provided in any one of the first through thirty-second embodiments and other embodiments described herein. In one embodiment, the molecular weight of the lubricant is between about 700 and about 780, about 700 and about 760, about 700 and about 740, or about 700 and about 720. In one embodiment, the molecular weight of the lubricant is about 700, about 720, about 740, about 760, about 780, or about 800.

In a thirty-fourth embodiment, the present disclosure provides a process according to any one of the first through thirty-third embodiments, wherein the weight ratio between the plastic and the catalyst is about 200:1 to about 1:1. The definitions of the remaining variables are provided in any one of the first through thirty-third embodiments and the other embodiments described herein. In one embodiment, the weight ratio between the plastics and the catalyst is about 190:1 to about 1:1, about 180:1 to about 1:1, about 170:1 to about 1:1, about 160:1 to about 1:1, about 150:1 to about 1:1, about 140:1 to about 1:1, about 130:1 to about 1:1, about 120:1 to about 1:1, about 110:1 to about 1:1, about 100:1 to about 1:1, about 90:1 to about 1:1, about 80:1 to about 1:1, about 70:1 to about 1:1, about 60:1 to about 1:1, about 50:1 to about 1:1, about 40:1 to about 1:1, about 30:1 to about 1:1, about 20:1 to about 1:1, about 10:1 to about 1:1, about 9:1 to about 1:1, about 8:1 to about 1:1, about 7:1 to about 1:1, about 6:1 to about 1:1, about 5:1 to about 1:1, about 4:1 to about 1:1, about 3:1 to about 1:1, or about 2:1 to about 1:1. In one embodiment, the weight ratio between the plastics and the catalyst is about 200:1, about 190:1, about 180:1, about 170:1, about 160:1, about 150:1, about 140:1, about 130:1, about 120:1, about 110:1, about 100:1, about 90:1, about 80:1, about 70:1, about 60:1, about 50:1, about 40:1, about 30:1, about 20:1, about 10:1, about 9:1, about 8:1, about 7:1, about 6:1, about 5:1, about 4:1, about 3:1, about 2:1, or 1:1.

In a thirty-fifth embodiment, the present disclosure provides a process according to any one of the first through thirty-fourth embodiments, wherein the weight ratio between the plastics and the catalyst is about 100:1 to about 5:1. The definitions of the remaining variables are provided in any one of the first through thirty-fourth embodiments and the other embodiments described herein.

In a thirty-sixth embodiment, the present disclosure provides a process according to any one of the first through thirty-fifth embodiments, wherein the weight ratio between the plastics and the catalyst is about 80:1 to about 8:1. The definitions of the remaining variables are provided in any one of the first through thirty-fifth embodiments and the other embodiments described herein.

In a thirty-seventh embodiment, the present disclosure provides a process according to any one of the first through thirty-sixth embodiments, wherein the weight ratio between the plastics and the catalyst is about 60:1 to about 15:1. The definitions of the remaining variables are provided in any one of the first through thirty-sixth embodiments and the other embodiments described herein.

In a thirty-eighth embodiment, the present disclosure provides a process according to any one of the first through thirty-seventh embodiments, wherein the weight ratio between the plastics and the catalyst is about 40:1 or about 20:1. The definitions of the remaining variables are provided in any one of the first through thirty-seventh embodiments and the other embodiments described herein.

In a thirty-ninth embodiment, the present disclosure provides a process according to any one of the first through thirty-eighth embodiments, wherein the conversion of the plastics is at least about 70%. The definitions of the remaining variables are provided in any one of the first through thirty-eighth embodiments and the other embodiments described herein. In one embodiment, the conversion of the plastics is at least about 75%, at least about 80%, at least about 85%, at least about 90%, at least about 95%, or at least about 99%.

In a fortieth embodiment, the present disclosure provides a process according to any one of the first through thirty-ninth embodiments, wherein the conversion of the plastics is at least about 85%. The definitions of the remaining variables are provided in any one of the first through thirty-ninth embodiments and the other embodiments described herein.

In a forty-first embodiment, the present disclosure provides a process according to any one of the first through fortieth embodiments, wherein the conversion of the plastics is at least about 90%. The definitions of the remaining variables are provided in any one of the first through fortieth embodiments and the other embodiments described herein.

In a forty-second embodiment, the present disclosure provides a process according to any one of the first through forty-first embodiments, wherein the conversion of the plastics is at least about 95%. The definitions of the remaining variables are provided in any one of the first through forty-first embodiments and the other embodiments described herein.

In a forty-third embodiment, the present disclosure provides a process according to any one of the first through forty-second embodiments, wherein the yield of the lubricant is at least about 5%. The definitions of the remaining variables are provided in any one of the first through forty-second embodiments and the other embodiments described herein. In one embodiment, the yield of the lubricant is at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99%.

In a forty-fourth embodiment, the present disclosure provides a process according to any one of the first through forty-third embodiments, wherein the yield of the lubricant is at least about 20%. The definitions of the remaining variables are provided in any one of the first through forty-third embodiments and the other embodiments described herein.

In a forty-fifth embodiment, the present disclosure provides a process according to any one of the first through forty-fourth embodiments, wherein the yield of the lubricant is at least about 40%. The definitions of the remaining variables are provided in any one of the first through forty-fourth embodiments and the other embodiments described herein.

In a forty-sixth embodiment, the present disclosure provides a process according to any one of the first through forty-fifth embodiments, wherein the yield of the lubricant is at least about 60%. The definitions of the remaining variables are provided in any one of the first through forty-fifth embodiments and the other embodiments described herein.

In a forty-seventh embodiment, the present disclosure provides a process according to any one of the first through forty-sixth embodiments, wherein the yield of the lubricant is at least about 80%. The definitions of the remaining variables are provided in any one of the first through forty-sixth embodiments and the other embodiments described herein.

In a forty-eighth embodiment, the present disclosure provides a process according to any one of the first through forty-seventh embodiments, wherein A is a metal selected from the group consisting of ruthenium, nickel, and cobalt. The definitions of the remaining variables are provided in any one of the first through forty-seventh embodiments and the other embodiments described herein.

In a forty-ninth embodiment, the present disclosure provides a process according to any one of the first through forty-eighth embodiments, wherein A is ruthenium. The definitions of the remaining variables are provided in any one of the first through forty-eighth embodiments and the other embodiments described herein.

In a fiftieth embodiment, the present disclosure provides a process according to any one of the first through forty-ninth embodiments, wherein R is selected from a group consisting of carbon, silicon, aluminum, cerium, and titanium. The definitions of the remaining variables are provided in any one of the first through forty-ninth embodiments and the other embodiments described herein.

In a fifty-first embodiment, the present disclosure provides a process according to any one of the first through fiftieth embodiments, wherein R is titanium. The definitions of the remaining variables are provided in any one of the first through fiftieth embodiments and the other embodiments described herein.

In a fifty-second embodiment, the present disclosure provides a process according to any one of the first through fifty-first embodiments, wherein Q is oxygen. The definitions of the remaining variables are provided in any one of the first through fifty-first embodiments and the other embodiments described herein.

In a fifty-third embodiment, the present disclosure provides a process according to any one of the first through fifty-second embodiments, wherein the weight percentage of the component A is about 0.5% to 100% of the weight of the catalyst. The definitions of the remaining variables are provided in any one of the first through fifty-second embodiments and the other embodiments described herein. In one embodiment, the weight percentage of the component A is about 0.5% to about 95%, about 0.5% to about 90%, about 1.0% to about 85%, about 2.0% to about 80%, 3.0% to about 75%, about 4.0% to about 70%, about 5.0% to about 65%, about 5.0% to about 60%, about 5.0% to about 55%, about 5.0% to about 50%, about 5.0% to about 45%, about 5.0% to about 40%, about 5.0% to about 35%, about 5.0% to about 30%, about 5.0% to about 25%, about 5.0% to about 20%, about 5.0% to about 15%, about 5.0% to about 10%, or about 5.0% to about 8.0% of the weight of the catalyst. In one embodiment, the weight percentage of the component A is about 0.5%, about 1.0%, about 1.5%, about 2.0%, about 2.5%, about 3.0%, about 3.5%, about 4.0%, about 4.5%, about 5.0%, about 5.5%, about 6%, about 8%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, of the weight of the catalyst.

In a fifty-fourth embodiment, the present disclosure provides a process according to any one of the first through fifty-third embodiments, wherein the weight percentage of the component A is about 0.5% to about 50% of the weight of the catalyst. The definitions of the remaining variables are provided in any one of the first through fifty-third embodiments and the other embodiments described herein.

In a fifty-fifth embodiment, the present disclosure provides a process according to any one of the first through fifty-fourth embodiments, wherein the weight percentage of the component A is about 1.0% to about 25% of the weight of the catalyst. The definitions of the remaining variables are provided in any one of the first through fifty-fourth embodiments and the other embodiments described herein.

In a fifty-sixth embodiment, the present disclosure provides a process according to any one of the first through fifty-fifth embodiments, wherein the weight percentage of the component A is about 2.0% to about 15% of the weight of the catalyst. The definitions of the remaining variables are provided in any one of the first through fifty-fifth embodiments and the other embodiments described herein.

In a fifty-seventh embodiment, the present disclosure provides a process according to any one of the first through fifty-sixth embodiments, wherein the weight percentage of the component A is about 4.0% to about 15% of the weight of the catalyst. The definitions of the remaining variables are provided in any one of the first through fifty-sixth embodiments and the other embodiments described herein. In one embodiment, the weight percentage of the component A is about 4.0% to about 14%, about 4.0% to about 13%, about 4.0% to about 12%, about 4.0% to about 11%, about 4.0% to about 10%, about 4.0% to about 9.0%, about 4.0% to about 8.0%, about 4.0% to about 7.0%, about 4.0% to about 6.0%, or about 4.0% to about 5.0% of the weight of the catalyst.

In a fifty-eighth embodiment, the present disclosure provides a process according to any one of the first through fifty-seventh embodiments, wherein the weight percentage of the component A is about 4.0%, about 4.8%, about 4.9%, about 5.0%, about 5.1%, about 5.9%, or about 15% of the weight of the catalyst. The definitions of the remaining variables are provided in any one of the first through fifty-seventh embodiments and the other embodiments described herein. In one embodiment, the weight percentage of the component A is about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, or about 6.0%.

In a fifty-ninth embodiment, the present disclosure provides a process according to any one of the first through forty-eighth, fiftieth, or fifty-third through fifty-eighth embodiments, wherein the catalyst is selected from a group consisting of $Ru/SiO_2$, Ru/C, $Ru/Al_2O_3$, $Ru/CeO_2$, $Ru/TiO_2$, $Ni/SiO_2$, Ni, $Co/SiO_2$, and a mixture thereof. The definitions of the remaining variables are provided in any one of the first through forty-eighth, fiftieth, or fifty-third through fifty-eighth and the other embodiments described herein.

In a sixtieth embodiment, the present disclosure provides a process according to any one of the first through fifty-ninth embodiments, wherein
A is ruthenium
R is titanium;
m is 1;
Q is oxygen; and
n is 2.

The definitions of the remaining variables are provided in any one of the first through fifty-ninth embodiments and the other embodiments described herein.

In a sixty-first embodiment, the present disclosure provides a process according to any one of the first through sixtieth embodiments, wherein A is a ruthenium nanoparticle. The definitions of the remaining variables are provided in any one of the first through sixtieth embodiments and the other embodiments described herein.

In a sixty-second embodiment, the present disclosure provides a process according to the sixty-first embodiments, wherein the average size of the ruthenium nanoparticle is about 0.5 nm to 2.0 nm based on STEM images. The definitions of the remaining variables are provided in the sixty-first embodiment and the other embodiments described herein. In one embodiment, the average size of the ruthenium nanoparticle is about 0.5 nm, about 0.6 nm, about 0.7 nm, about 0.8 nm, about 0.9 nm, about 1.0 nm, about 1.1 nm, about 1.2 nm, about 1.3 nm, about 1.4 nm, about 1.5 nm, about 1.6 nm, about 1.7 nm, about 1.8 nm, about 1.9 nm, or about 2.0 nm.

In a sixty-third embodiment, the present disclosure provides a process according to the sixty-first or sixty-second embodiment, wherein the average size of the ruthenium nanoparticle is about 1.3 nm on STEM images. The definitions of the remaining variables are provided in the sixty-first or sixty-second embodiment and the other embodiments described herein.

In a sixty-fourth embodiment, the present disclosure provides a process according to any one of the first through sixty-third embodiments, wherein $R_mQ_n$ is a $TiO_2$ nanopowder.

The definitions of the remaining variables are provided in the first through sixty-third embodiments and the other embodiments described herein.

In a sixty-fifth embodiment, the present disclosure provides a process according to the sixty-fourth embodiment, wherein the $TiO_2$ nanopowder is anatase. The definitions of the remaining variables are provided in the sixty-fourth embodiment and the other embodiments described herein.

In a sixty-sixth embodiment, the present disclosure provides a process according to the sixty-fourth or sixty-fifth embodiment, wherein the average size of the $TiO_2$ nanopowder is about 10 to about 20 nm. The definitions of the remaining variables are provided in the sixty-fourth or sixty-fifth embodiment and the other embodiments described herein. In one embodiment, the average size of the $TiO_2$ nanopowder is about 10 nm, about 11 nm, about 12 nm, about 13 nm, about 14 nm, about 15 nm, about 16 nm, about 17 nm, about 18 nm, about 19 nm, or about 20 nm.

In a sixty-seventh embodiment, the present disclosure provides a process according to any one of the sixtieth through sixty-sixth embodiments, wherein the catalyst is prepared by a wetness impregnation method. The definitions of the remaining variables are provided in the sixtieth through sixty-sixth embodiments and the other embodiments described herein.

In a sixty-eighth embodiment, the present disclosure provides a process according to the sixty-seventh embodiment, wherein the wetness impregnation method comprises heating $TiO_2$ with a ruthenium nitrosyl nitrate solution. The definitions of the remaining variables are provided in the sixty-seventh embodiments and the other embodiments described herein.

In a sixty-ninth embodiment, the present disclosure provides a process according to the sixty-eighth embodiment, wherein the ruthenium nitrosyl nitrate solution is a $HNO_3$ solution. The definitions of the remaining variables are provided in the sixty-eighth embodiment and the other embodiments described herein.

In a seventieth embodiment, the present disclosure provides a process according to any one of the sixtieth through sixty-ninth embodiments, wherein the plastic is mechanically mixed with the catalyst. The definitions of the remaining variables are provided in any one of the sixtieth through sixty-ninth embodiments and the other embodiments described herein.

In a seventy-first embodiment, the present disclosure provides a process according to the seventieth embodiment, wherein
the mass of plastic is about 0.5 to about 10.0 g;
the weight ratio of the plastic to the catalyst is between about 10 to about 40;
the temperature is between about 225° C. and 275° C.; and
the process is carried out in the hydrogen atmosphere between about 20 bar and about 40 bar.
The definitions of the remaining variables are provided in the seventieth embodiment and the other embodiments described herein.

In a seventy-second embodiment, the present disclosure provides a process according to the seventy-first embodiment, wherein
the mass of plastic is about 2 g;
the weight ratio of the plastic to the catalyst is about 20 or about 40;
the temperature is about 250° C.; and
the process is carried out in the hydrogen atmosphere of about 30 bar.
The definitions of the remaining variables are provided in the seventy-first embodiment and the other embodiments described herein.

2. Definitions

To facilitate understanding of the disclosure set forth herein, a number of terms are defined below. Unless defined otherwise, all technical and scientific terms used herein have the same meaning as commonly understood by one of ordinary skill in the art to which this disclosure belongs. In case of conflict, the present application including the definitions will control. Unless otherwise required by context, singular terms shall include pluralities and plural terms shall include the singular. All publications, patents and other references mentioned herein are incorporated by reference in their entireties for all purposes as if each individual publication or patent application were specifically and individually indicated to be incorporated by reference.

Although methods and materials similar or equivalent to those described herein can be used in practice or testing of the present disclosure, suitable methods and materials are described below. The materials, methods and examples are illustrative only and are not intended to be limiting. Other features and advantages of the disclosure will be apparent from the detailed description and from the claims.

In this specification and the appended claims, the singular forms "a," "an" and "the" include plural referents unless the context clearly dictates otherwise. The terms "a" (or "an"), as well as the terms "one or more," and "at least one" can be used interchangeably herein. In certain aspects, the term "a" or "an" means "single." In other aspects, the term "a" or "an" includes "two or more" or "multiple."

The term "about" is used herein to mean approximately, roughly, around, or in the regions of. When the term "about" is used in conjunction with a numerical range, it modifies that range by extending the boundaries above and below the numerical values set forth. In general, the term "about" is used herein to modify a numerical value above and below the stated value by a variance of 10 percent, up or down (higher or lower).

The term "$M_n$" as used herein generally refers to the number averaged molecular weight. In general, it means the total weight of all the polymer molecules in a sample, divided by the total number of polymer molecules in a sample. In one embodiment, the number average molecular weight may be defined by the formula:

$$Mn = \frac{\Sigma N_i M_i}{\Sigma N_i},$$

where $M_i$ is the molecular weight of a chain and $N_i$ is the number of chains of that molecular weight.

The term "$M_w$" as used herein generally refers to weight average molecular weight. It generally refers to a molecular weight measurement that depends on the contributions of polymer molecules according to their sizes. In one embodiment, the weight average molecular weight may be defined by the formula:

$$Mw = \frac{\Sigma N_i M_i^2}{\Sigma N_i M_i},$$

where $M_i$ is the molecular weight of a chain and $N_i$ is the number of chains of that molecular weight. In general, molecular weight averages may be determined by gel permeation chromatography (GPC) and size exclusion chromatography (SEC). In one embodiment, $M_w$ is determined by SEC analyses performed on an Alliance Separation Module (Waters 2695), including a pump, autoinjector, degasser, and column oven. The eluent was N-methylpyrolidone (NMP), with 10 mM LiBr. The injection volume was 150 µl. The flow was established at 1.0 ml/min Three GRAM (PSS) columns (10 µm, 100 Å, ID 8.0 mm×300 mm (300-60 000 Da)+2 times 10 µm, 10000 Å, ID 8.0 mm×300 mm (10 000-50 000 000 Da)) with a guard column (10 µm, Guard, ID 8.0 mm×50 mm) were applied at a temperature of 70° C. The detection was performed with a differential refractive index detector (Waters 2410). The sample solutions were prepared with a concentration of 5 mg solids in 1 ml NMP LiBr 10 mM, and the samples were dissolved for a period of 24 hours. Calibration is performed with eight polystyrene standards (polymer standard services), ranging from 500 to 5,000,000 gram/mol. The calculation was performed with Millenium 32 software (Waters) with a third order calibration curve.

The term "KV100" as used herein generally refers to kinematic viscosities at 100° C.

The term "KV40" as used herein generally refers to kinematic viscosities at 40° C.

The term "kinematic viscosity" as used herein genereally refers a measure of the resistive flow of a fluid under the influence of gravity. When two fluids of equal volume and differing viscosity are placed in identical capillary viscometers and allowed to flow by gravity, the more viscous fluid typically takes longer than the less viscous fluid to flow through the capillary. The dimension of kinematic viscosity is length/time. Commonly, kinematic viscosity is expressed in centiStokes (cSt). The SI unit of kinematic viscosity is $mm^2/s$, which is equal to 1 cSt.

The term "pour point" as used herein generally refers to the lowest temperature at which a fluid will pour or flow. (see, e.g., ASTM International Standard Test Methods D 5950-96, D 6892-03, and D 97). The results are reported in degrees Celsius.

The term "oxidation onset temperature" as used herein generally refers to a relative measure of the degree of oxidative stability of the material evaluated at a given heating rate and oxidative environment, determined by calorimetric measurement of the temperature at the beginning of the exothermal oxidation of the material, which is exposed to an oxygen or air atmosphere under atmospheric pressure at a fixed heating rate (see, e.g., ASTM International Standard Test Methods D6186).

The term "plastics" as used herein generally refers to a material based on organic macromolecules composed mainly of carbon and hydrogen, such as polyolefins, or also comprising oxygen, such as polyesters, polyethers, acrylic and methacrylic polymers, polyacetals, or macromolecules also comprising nitrogen, such as polyamides and polyurethanes, or macromolecules also comprising halogens, such as polyvinyl chloride and fluorinated polymers, or sulfur-containing macromolecules, such as polysulfides and polysulfones, or copolymers obtained by combining various monomers, such as acrylonitrile-butadiene copolymers (ABS) and like. In one embodiment, the plastics used in the present disclosure are recycled plastics, i.e. recovered from household and/or industrial waste by appropriate mechanical selection and grinding operations, as is known in the art. It therefore also can contain various additives and other components used in the production of the articles from which the recycled plastic derives. In one embodiment, the carbon content of the plastic used is greater than 45% by weight, greater than 60% by weight, or greater than 70% by weight. In one embodiment, the hydrogen content of the plastic used is greater than 5% by weight, greater than 8% by weight, or greater than 12% by weight. In one embodiment, the oxygen content is less than 20% by weight, less than 10% by weight, or less than 7% by weight. In one embodiment, the content of nitrogen, halogens and sulfur is overall less than 3% by weight, less than 2% by weight, or it is less than 0.5% by weight.

The term "polyolefin polymer" as used herein generally refers to all polymers and copolymers (including high pressure low density polyethylene (LDPE), heterogeneous polymers, random, block, and graft polymers, interpolymers and copolymers) comprising one or more polymerized monomers selected from the group consisting of ethylene, an alpha olefin having from 3-20 carbon atoms (such as 1-propylene, 1-butene, 1-hexene, styrene, 1-heptene and 1-octene), 4-methyl-1-pentene, and/or acetylenically unsaturated monomers having from 2-20 carbons, and/or diolefins having from 4-18 carbons and any other monomer used in the art to modify the density of a polymer. Heterogeneous polymers include Ziegler-Natta polymerized polymers such as LLDPE and HDPE and include products such as DOWLEX™ Linear Low Density Polyethylene (LLDPE) made by The Dow Chemical Company. The random copolymers include those polymerized using metallocene or constrained geometry catalyst technology and include polymers such as AFFINITY™ Polyolefin Plastomer and ENGAGE™ Polyolefin Elastomer both available from The Dow Chemical Company, and EXACT™ Polyolefin available from Exxon-Mobil. Methods for polymerizing these random copolymers are well known in the art and include those described in U.S. Pat. Nos. 5,272,236 and 5,278,272. The block copolymers include those polymerized using chain shuttling technology and two catalyst species, such as is disclosed in U.S. Pat. No. 7,355,089, and include polymers such as INFUSE™ Olefin Block Copolymers made by The Dow Chemical Company. In addition the term "polyolefin polymer" in this disclosure is defined as a polymer having an average molecular weight, as determined by light scattering, greater than 1,000 grams per mole (in one embodiment, 2,000 grams per mole, greater than 4,000 grams per mole, or can be as high as 10 million grams per mole). The polyolefin polymer can be a copolymer consisting essentially of polymerized ethylene monomer and a polymerized alpha olefin monomer such as 1-octene. The polyolefin polymer can be a copolymer consisting essentially of polymerized propylene monomer and a polymerized alpha olefin monomer such as ethylene. Such propylene based polymers include homopolymer polypropylene, impact propylene based copolymers, and random propylene based copolymers. Other more specialized polymers include ethylene/acrylic acid copolymers, ethylene/vinyl acetate copolymers and ethylene/styrene interpolymers, halogenated polymers, and polymers containing maleic anhydride moeities.

The term "polypropylene" means polyolefin containing more than 50.0% (by number) recurring propylene-derived units. In one embodiment, polypropylene homopolymer and/or polypropylene copolymer wherein at least 85% (by number) of the recurring units are propylene units. In one embodiment, polypropylene as used herein refers to a polymer consisting of 100% recurring propylene units.

The term "isotactic polypropylene" as used herein generally refers to a polypropylene where pendant groups (e.g., alkyl group such as methyl group) are oriented on one side of the carbon backbone, or at least 10%, 20%, 30%, 40%, 50%, 60%, 80%, 90%, or greater of all methyl groups oriented on one side of the carbon backbone, such that the isotactic polypropylene has greater structural rigidity or crystallinity to non-isotactic polymer (e.g., polypropylene).

The term "amorphous polypropylene" or "atactic polypropylene" as used herein generally refers to a polypropylene having random orientation of the pendant groups (e.g., alkyl groups such as methyl groups) along the polymer chain. What is meant by "amorphous" refers to be non-crystalline, for example, not having definite form nor apparent structural rigidity. The atactic polypropylene may be a random copolymer obtained, or obtainable, by polymerization of a homopolypropylene with one comonomer selected from a group consisting of propylene, ethylene, butylenes, and octene, or a block copolymer of polypropylene and ethylene-propylene.

The term "syndiotactic polypropylene" as used herein generally refers to polypropylene in which the substituents (e.g., alkyl group such as methyl group) have alternating positions along the polymer chain. In one embodiment, the term "syndiotactic polypropylene" is defined as having 10% or more syndiotactic pentads.

The term "lubricant" as used herein generally refers to a substance that can be introduced between two or more moving surfaces and lowers the level of friction between two adjacent surfaces moving relative to each other. In one embodiment, it refers to a mixture of hydrocarbons having a carbon number distribution between about 13 and about 60.

The term "light lubricant" as used herein generally refers to the lubricant of which $M_w$ is between about 690 and about 750, $M_n$ is between about 630 and about 660, and/or PDI is about 1.1.

The term "heavy lubricant" as used herein generally refers to the lubricant of which a molecular weight is higher than a light lubricant and less than 3,000.

The term "carbon number distribution" as used herein generally refers to the range of compounds present in a composition, wherein each compound is defined by the number of carbon atoms present.

The term "polydispersity index" as used herein generally refers to the ratio of weight average molecular weight and number average molecular weight.

EXAMPLES

Useful embodiments of processes of the disclosure are provided in the following Examples. It should be understood that the Examples are given by way of illustration only.

General Materials and Methods a. Catalyst Preparation

Catalysts were prepared using the wetness impregnation method. $TiO_2$ nanopowder (99.5%, US Research Nanomaterials, 5 nm, anatase) was first calcined at 450° C. for 4 h in air. Then $TiO_2$ was heated to 70° C. with the subsequent addition of ruthenium nitrosyl nitrate $Ru(NO)(NO_3)_3$ solution in diluted $HNO_3$ (Sigma-Aldrich #373567). The suspension was vigorously stirred with a glass rod for 1.5 h until complete dryness, then stored in an oven at 100° C. for 12 h. Before the reaction, the catalyst was reduced in flow of 50% $H_2$/He at 300° C. for 2 h (ramping rate 10° C./min). The procedure on other supports, including $SiO_2$ (Davisil 646, Sigma-Aldrich) and $CeO_2$ (44960 Alfa Aesar), was the same. Boehmite (Pural-SB, Sasol) was calcined at 550° C. for 6 h in air to prepare the $Al_2O_3$ support. Ru/C (5% Ru loading, Sigmal-Aldrich) was used as received.

b. Feedstocks

Isotactic polypropylene (i-PP, average $M_w$~250,000, average $M_n$~67,000), low molecular weight isotactic polypropylene (1-PP, average Mw~12,000, average Mn~5,000) and amorphous PP (a-PP, 428175) were purched from Sigma-Aldrich. 500 mL PP bottles were purched from United Scientific (#33309). PP transparent bags (140×184 mm) were obtained from AIRSUNNY (item model number AS-57DZ-100).

c. Catalyst Characterization

The Ru loading was estimated using XRF analysis on a Rigaku Supermini 200 WDXRF in a He atmosphere. XRD patterns were obtained on a Brucker D8 diffractometer with 0.05° 2θ step size using Cu K α radiation (λ1.54 Å). $N_2$ sorption isotherms at −196° C. were recorder on Micromeritics ASAP 2020 instrument. Before measurements, the samples were degassed at 300° C. for 3 h. Photoelectron spectra were recorded on a Thermo Fisher K-Alpha+machine with a Al $K_\alpha$ monochromatic source. Before measurements, the samples were reduced in 50% $H_2$/He flow at 300° C. and then deposited on a Cu foil. For binding energy reference, the C is line at 284.6 eV was used. TEM images were acquired on an Aberration Corrected Scanning/Transmission Electron Microscope, JEOL NEOARM TEM/STEM.

d. Product Analysis

After the temperature dropped below 10° C., the gas from the reactor's headspace was transferred to a 1 L Tedlar gas sampling bag for analysis. Then the reactor was opened, liquid and solid residue were mixed with 20 mL of $CH_2Cl_2$, used as a solvent. This slurry was filtered (Whatman, 100 μm) and the solid residue was dried at room temperature overnight. The solvent was removed from the liquid fraction using a rotary evaporator. The solid and liquid fraction yields were quantified gravimetrically.

A GC with an FID detector (Agilent 7890 Series, HP-volamine column) was used for gas analysis. Liquid products were analyzed using gel permeation chromatography (GPC) using Styragel HR 3 and μStyragel $10^3$ Å columns (dimensions 7.8×300 mm) in tandem using toluene or THF as solvents (0.7 ml/min flow rate) and a Waters 2414 refractive index detector (RID). The retention time was calibrated using Polystyrene ReadyCal Standards Kit (Waters, WAT058931).

ATR spectra of liquid and solid samples and the initial polymers were measured using a Nicolet Nexus 640 spectrometer with an Smart Orbit Diamond ATR accessory in the 4000-650 $cm^{-1}$ range. Heteronuclear single quantum coherence (HSQC) nuclear magnetic resonance (NMR) spectra of liquid products were recorded at 25° C. on an Avance III 400 MHz NMR spectrometer (Bruker). Approximately 90 mg of the sample was mixed with 500 μl of toluene-d8. Data processing was performed using the Mestrelab Research software (mNOVA).

The lubricant properties were evaluated according to the American Society for Testing and Materials (ASTM) methods. The kinematic viscosities at 100° and 40° C. (KV100 and KV40) were determined using the ASTM D445 method. The VI was calculated using the KV100 and KV40 following the ASTM D2270 method. The pour point (ASTM D5949), oxidation inset temperature (ASTM D6186) were measured at Southwest Research Institute (San Antonio, TX).

Example 1

Coversion of i-PP Over Ru-Based Catalysts 2 g of isotactic polypropylene (i-PP) was mixed with four Ru-based catalysts and heated to 250° C. for 16 hours under 30 bar of hydrogen. The reaction conversion and product distribution are summarized in Table 1 below and FIG. 3a.

TABLE 1

| Catalyst | Yields, % | | | | | | | |
|---|---|---|---|---|---|---|---|---|
| | $C_1$ | $C_2$ | $C_3$ | $C_4$ | $C_5$ | $C_6$ | Liquid | Solid |
| Ru/$SiO_2$ | 55 | 5 | 2 | 2 | 0.5 | 1 | 23.6 | 5.7 |
| Ru/C | 82 | 10 | 4 | 4 | 1 | 2 | 0.0 | 0.0 |
| Ru/$CeO_2$ | 82 | 7.2 | 3 | 3 | 1 | 1 | 6.8 | 0.0 |

Figure 3:
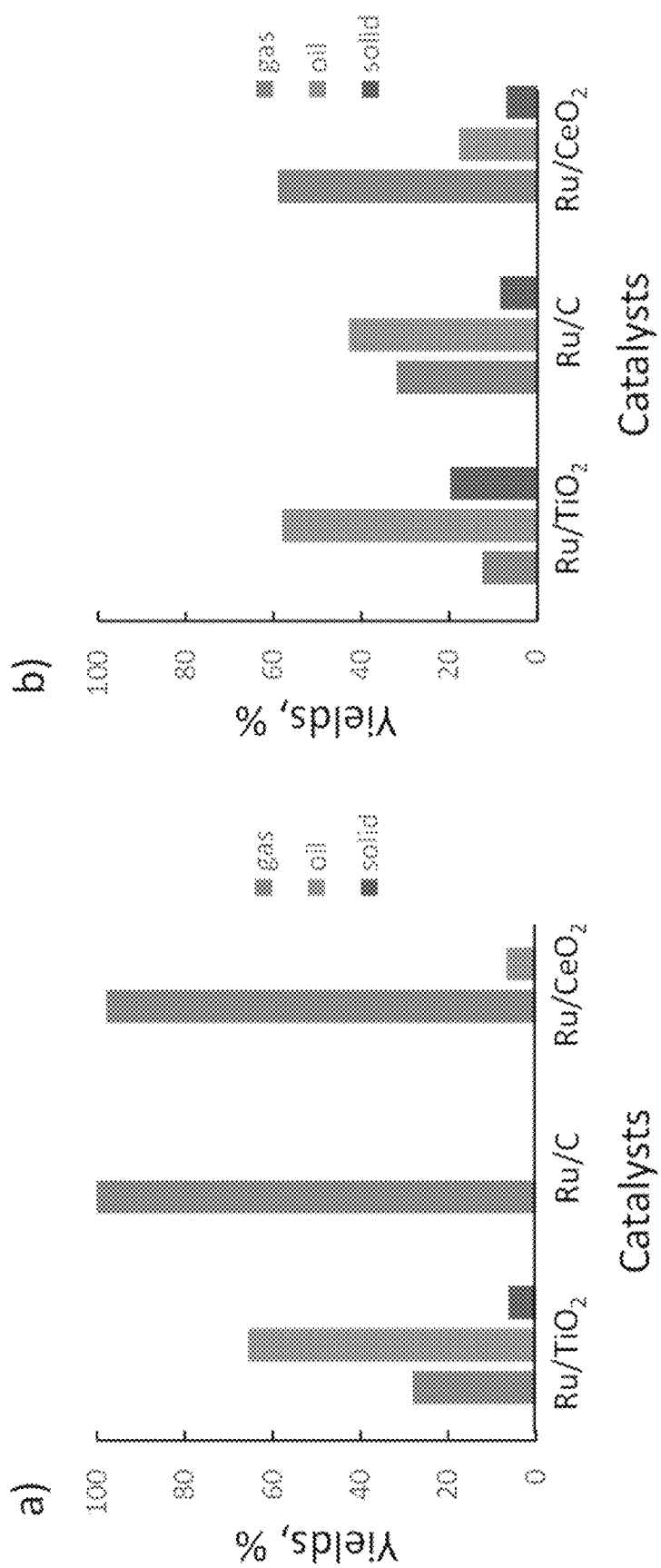
FIG. 3a shows the yields of gas, liquid, and solid over the Ru-based catalysts with a polymer to catalyst mass ratio of 20 at the reaction conditions of 250° C., 16 h, 30 bar $H_2$ pressure, and 2 g i-PP loading.
FIG. 3b shows the yields of gas, liquid, and solid over the Ru-based catalysts with a polymer to catalyst mass ratio of 20 at the reaction conditions of 250° C., 16 h, 30 bar $H_2$ pressure, and 2 g i-PP loading.

FIG. 3b shows the yields of gas, liquid, and solid over the same Ru-based catalysts with a polymer to catalyst mass ratio of 40 at the same reaction conditions.

Example 2

Catalyst Comparison—Effect of Metal and Support i-PP with a moderate molecular weight was selected as the primary substrate. Several transition metal (M) nanoparticles were deposited on $TiO_2$ and screened at 250° C. (Table 2), a relatively low temperature where chemistry happens in the polymer melt. The catalyst amount is 0.1 g. Most of the M/$TiO_2$ catalysts show nearly no conversion of the i-PP. The remaining solid possesses a melting point of ca. 168° C., similar to the initial polymer. The increased peak width, evidenced by differential scanning calorimetry (DSC), corresponds to minor catalyst-polymer interactions. Recent reports by Celik, G., et al. (*Acs Central Science* 2019, 5, 1795-1803) and Tennakoon, A., et al. (Nature Catalysis 2020, 1-9), which show that polyethylene (PE) hydrogenolysis over a Pt-based catalyst requires temperatures >300° C., which is higher than used here, are consistent with the low Pt activity for i-PP in this experiment.

TABLE 2

| Catalyst | Metal loading according to XRF, wt % | Yields, % Gas ($C_1$-$C_6$) | Yields, % Liquid | Yields, % Solid | DSC analysis of solid $T_m$, °C.[a] | DSC analysis of solid FWHM of melting peak, °C.[a] | GPC analysis of liquid $M_w \times 10^{-3}$ g/mol | GPC analysis of liquid $M_n \times 10^{-3}$ g/mol | PDI |
|---|---|---|---|---|---|---|---|---|---|
| Transition metals on $TiO_2$ support ||||||||||
| Pd/$TiO_2$ | 5.6 | 0.6 | 0.0 | 98.7 | 171 | 15.3 | — | — | — |
| Rh/$TiO_2$ | 5.1 | 1.4 | 4.9 | 92.8 | 161 | 8.0 | — | — | — |
| Ir/$TiO_2$ | 5.0 | 0.4 | 0.0 | 93.5 | 166 | 10.4 | — | — | — |
| Ni/$TiO_2$ | | 0.1 | 0.0 | ≥99 | 168 | 14.0 | — | — | — |
| Pt/$TiO_2$ | 4.5 | 0.3 | 0.0 | ≥99 | 166 | 13.5 | — | — | — |
| Ru/$TiO_2$ | 5.9 | 28.2 | 65.6 | 6.4 | 113 | 70.9 | 0.69 | 0.63 | 1.1 |
| Ru on different supports ||||||||||
| Ru/$SiO_2$ | 4.9 | 65.3 | 23.6 | 5.7 | — | — | 0.66 | 0.61 | 1.1 |
| Ru/C | 5.0[c] | 100.0[d] | 0.0 | 0.0 | — | — | — | — | — |
| Ru/$Al_2O_3$[b] | 5.1 | 15.8 | 44.7 | 28.5 | — | — | 1.36 | 0.96 | 1.4 |
| Ru/$CeO_2$ | 4.8 | 97.8 | 6.8 | 0.0 | — | — | 0.33 | 0.32 | 1.0 |

Reaction conditions: 250° C., 16 h, 30 bar $H_2$ pressure, 2 g i-PP loading, 0.1 g of catalyst.
[a] for raw i-PP: $T_m$ equals 168° C. with FWHM of 10.0° C.;
[b] 8 h reaction time;
[c] according to manufacturer;
[d] quantitative conversion to gas within experimental error.
PDI stands for polydispersity index.

In contrast, the Ru/$TiO_2$ catalyst forms significant fractions of liquid oil (~66%), light $C_1$-$C_2$ hydrocarbons (~25%), and a minor fraction of $C_3$-$C_6$ gases (~3-4%). To evaluate the role of the support, Ru was deposited on several carriers (Table 1 or 2). The methane formation decreases in the order: Ru/C>Ru/$CeO_2$>Ru/$SiO_2$>Ru/$Al_2O_3$≈Ru/$TiO_2$. The liquid yield over Ru/$TiO_2$ is the highest.

The oil molecular weight distribution was determined by gel permeation chromatography (GPC). For all Ru-catalysts, both the number-averaged ($M_n$) and weight-averaged ($M_w$) molecular weights of the liquid are below $1.5 \times 10^3$ g/mol, significantly lower than the initial i-PP substrate ($M_w$~250× $10^3$ g/mol). Ru/$CeO_2$ produces an oil with the lowest $M_w$ and the highest $C_1$-$C_4$ gas yield (Table 2).

Example 3

Time-Dependent Isotactic Polypropylene (i-PP) Hydrogenolysis Over Ru/$TiO_2$

Reaction conditions: 250° C., 30 bar $H_2$, 2 g i-PP, 100 mg or 50 mg of Ru/$TiO_2$ catalyst for a polymer to catalyst ratio of 20 and 40, respectively.

Figure 2:
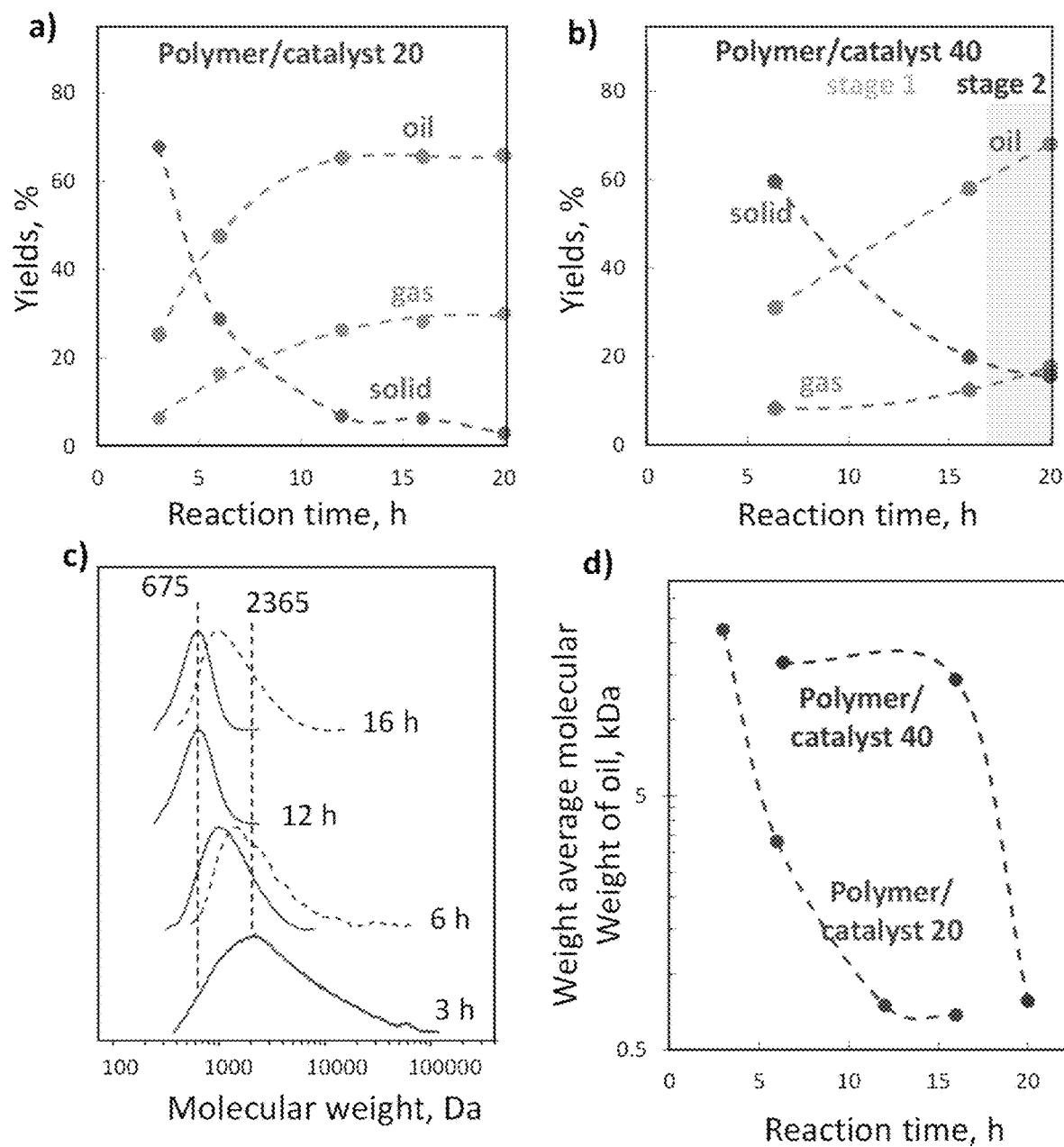
FIG. 2a shows time-dependent isotactic polypropylene (i-PP) hydrogenolysis over $Ru/TiO_2$ with polymer/catalyst weight ratio of 20.
FIG. 2b shows time-dependent isotactic polypropylene (i-PP) hydrogenolysis over $Ru/TiO_2$ with polymer/catalyst weight ratio of 40.
FIG. 2c shows mMolecular weight distributions of liquids at different reaction times derived from gel permeation chromatography (GPC) for polymer/catalyst ratio 20 (solid purple lines) and 40 (dotted red lines).
FIG. 2d shows effect of polymer/catalyst ratio on $M_w$ vs. reaction time.

Reaction profiles for a polymer to catalyst weight ratio of 20 are shown in FIG. 2a. The oil yield increases up to 66% with a concomitant decay of the residual solid below 10% and the formation of $C_{1-4}$ hydrocarbons (consisting of 85% methane) with a total gas yield up to 28% after 16 h. Analysis indicates a rapid decrease of the oil $M_w$ from an initial value for i-PP of $250 \times 10^3$ g/mol to $22.6 \times 10^3$ and $0.75 \times 10^3$ g/mol after 3 and 12 h of reaction, respectively (FIG. 2c). The polydispersion index (PDI), which reflects the broadening of the molecular weight dispersion (Table 3), also decreases with time due to the sequential consumption of the heavy portion of the distribution and the formation of relatively light oil. Upon a rather rapid change (stage 1) in the first ~10 h, the liquid products exhibit constant $M_w$ and PDI in the 12-16 h time interval (stage 2) due to slow hydrogenolysis. Notably, a further increase of the reaction time to 20 h does not lead to excess gas formation at the liquid's expense. Interestingly, no intermediate species with a molecular weight between light oil and gas form at any reaction time. The oil produced in 12-16 h time interval is denoted as light. Heavy oil refers to liquid products with a molecular weight higher than light oil.

TABLE 3

| Polymer/catalyst mass ratio | Reaction time, h | $M_w \times 10^{-3}$ g/mol | $M_n \times 10^{-3}$ g/mol | PDI |
|---|---|---|---|---|
| 40 | 6.3 | 16.76 | 4.06 | 4.1 |
| | 16 | 14.36 | 2.76 | 5.2 |
| | 20 | 0.78 | 0.46 | 1.7 |
| 20 | 6 | 3.31 | 1.46 | 2.3 |
| | 12 | 0.75 | 0.66 | 1.1 |
| | 16 | 0.69 | 0.63 | 1.1 |

Experiments with a polymer/catalyst weight ratio of 40 (FIG. 2b-d) show that reduced catalyst loading mainly affects the solid-to-heavy oil conversion rate. Specifically, the oil yield increases linearly with reaction time toward the previously observed value of 66% with a significant solid fraction (16-20%) left even after 20 h of reaction time. The oil fraction has a 6-7 times larger $M_w$ at short reaction times (FIG. 2c,d), and it takes longer to achieve the same ~0.7-$0.8 \times 10^3$ g/mol molecular weight. A constant $M_w$ oil is formed up to 16 h reaction time during which 80% of the solid is consumed. Significantly, a lower catalyst loading slows down both the heavy oil hydrogenolysis to light oil and its parallel gasification leading ultimately to improved selectivity to liquid products with less gas—the maximum yield of gas is just 18% after 20 h for the polymer/catalyst ratio of 40 compared to 28% after 16 h for the polymer/catalyst ratio of 20. The unexpected low methane production over Ru/$TiO_2$ (a catalyst known to produce chiefly methane) at low catalyst loadings departs profoundly from all prior reports, typically invoking high catalyst amounts.

Transient profiles (FIG. 2a,c) show the light oil formed after 12 h is almost unreactive for hydrogenolysis and gas formation, as evident from the flat slope for both gas and oil kinetic curves. Based on the molecular weight distributions and gas formation curve (FIG. 2a,c), heavy oil contributes more to gas formation than the light one. Comparison of curves in FIG. 2a,b reveals that gas is a secondary product, produced from the heavy oil and not from the initial polymer. The plastic conversion is sequential, forming heavy oil (stage 1) that further reacts to light oil (stage 2). Lower catalyst loadings promote the heavier oil product and enable tuning the product molecular weight distribution.

Example 4

Characterization Data of Ru/TiO$_2$ and TiO$_2$ Support

The structure of Ru/TiO$_2$ analyzed by XRD, STEM, and H$_2$ chemisorption (FIGS. 4a-c and Table 4) indicates small about 1.3 nm Ru nanoparticles on the surface of TiO$_2$ anatase nanoparticles.

TABLE 4

| Sample | Ru loading, wt % | (Ru/Ti)$_{surf}$[a] | $d_{TEM}$, nm[b] | $H_{chem}$, μmol/g | $S_{BET}$, m$^2$/g | Vp, cm$^3$/g |
|---|---|---|---|---|---|---|
| TiO$_2$ | — | 0 | — | — | 100 | 0.33 |
| Ru/TiO$_2$ | 3.1 | 0.19 | 1.2 | 135 | 100 | 0.35 |

[a]calculated from XPS data using relative sensitivity factors;

[b]calculated as $\dfrac{\sum n_i d_i^3}{\sum n_i d_i^2}$.

Figure 4:
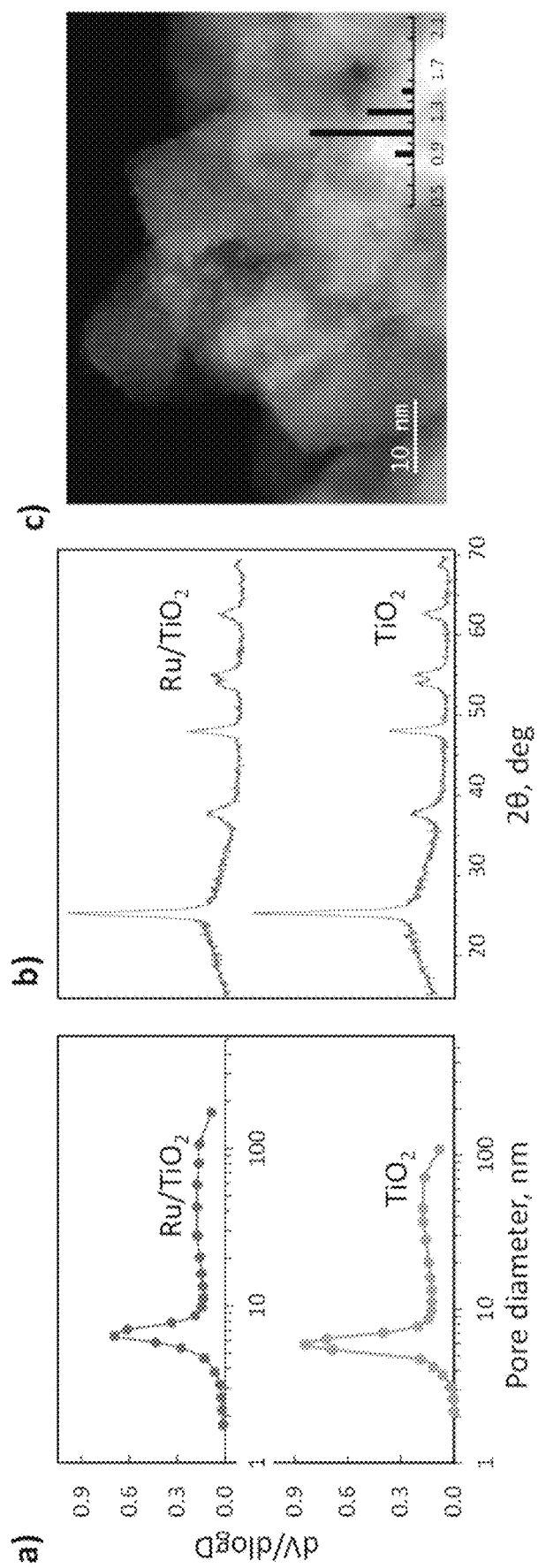
FIG. 4a shows BJH pore size distribution for a $Ru/TiO_2$ sample.
FIG. 4b shows XRD patterns for a $Ru/TiO_2$ sample.
FIG. 4c shows a STEM image for a $Ru/TiO_2$ sample. Inset shows particle size distribution derived from STEM images.

The BJH pore size distribution in FIG. 4a reveals that the porosity of TiO$_2$ is unaffected by the Ru nanoparticles. The anatase structure is preserved with similar d-spacings. No diffraction maxima for the Ru metal are found due to its small size. STEM images in FIG. 4c show about 1.3 nm Ru nanoparticles on the surface of 10-20 nm TiO$_2$ anatase crystals.

Example 5

Conversion of Diverse Polymer Feedstocks to Lubricants with Ru Based Catalysts

Figure 6:
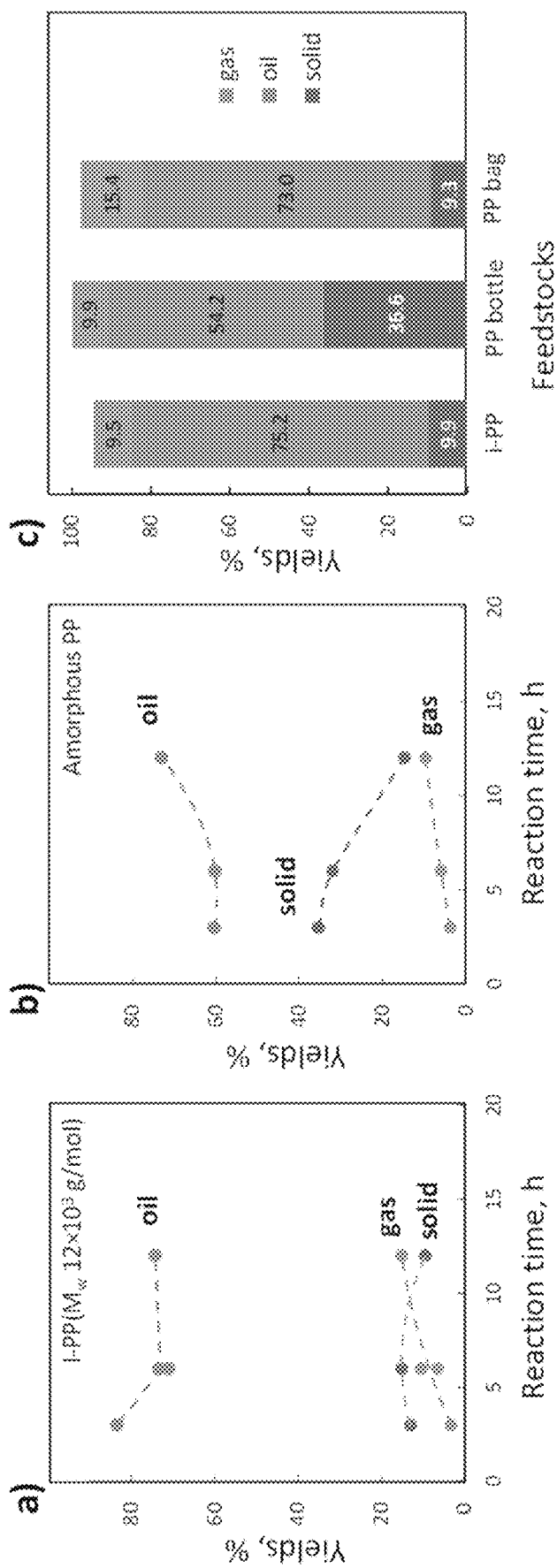
FIG. 6 shows yields of major products vs. reaction time using low molecular weight i-PP (a) and amorphous PP (b); (c) yields for a PP bottle (20 h reaction time) and bag (16 h reaction time).

Diverse feedstocks were converted into lubricants under reaction conditions: 250° C., 30 bar H$_2$, catalyst Ru/TiO$_2$ 50 mg, substrate 2 g. FIG. 6 shows yields of major products using low molecular weight i-PP, amorphous PP, PP bottle, and PP bag. Table 5 demonstrates molecular weight distribution of oil products over Ru/TiO$_2$ using different feedstocks.

TABLE 5

| Feedstock | Reaction time, h | $M_w \times 10^{-3}$ g/mol | $M_n \times 10^{-3}$ g/mol | PDI |
|---|---|---|---|---|
| 1-PP | 3 | 10.70 | 6.01 | 1.8 |
|  | 6 | 3.23 | 2.02 | 1.6 |
|  | 12 | 1.52 | 1.14 | 1.3 |

TABLE 5-continued

| Feedstock | Reaction time, h | $M_w \times 10^{-3}$ g/mol | $M_n \times 10^{-3}$ g/mol | PDI |
|---|---|---|---|---|
| a-PP | 3 | 22.15 | 10.06 | 2.2 |
|  | 6 | 23.89 | 6.74 | 3.6 |
|  | 12 | 6.65 | 2.93 | 2.3 |
| i-PP | 3 | 13.22 | 4.33 | 3.1 |
|  | 6 | 7.03 | 2.69 | 2.6 |
|  | 12 | 1.32 | 0.87 | 1.5 |
|  | 16 | 1.38 | 0.84 | 1.6 |
| PP bottle | 16 | 4.15 | 2.42 | 1.7 |
| PP bag | 16 | 3.02 | 1.68 | 1.8 |

Figure 5:
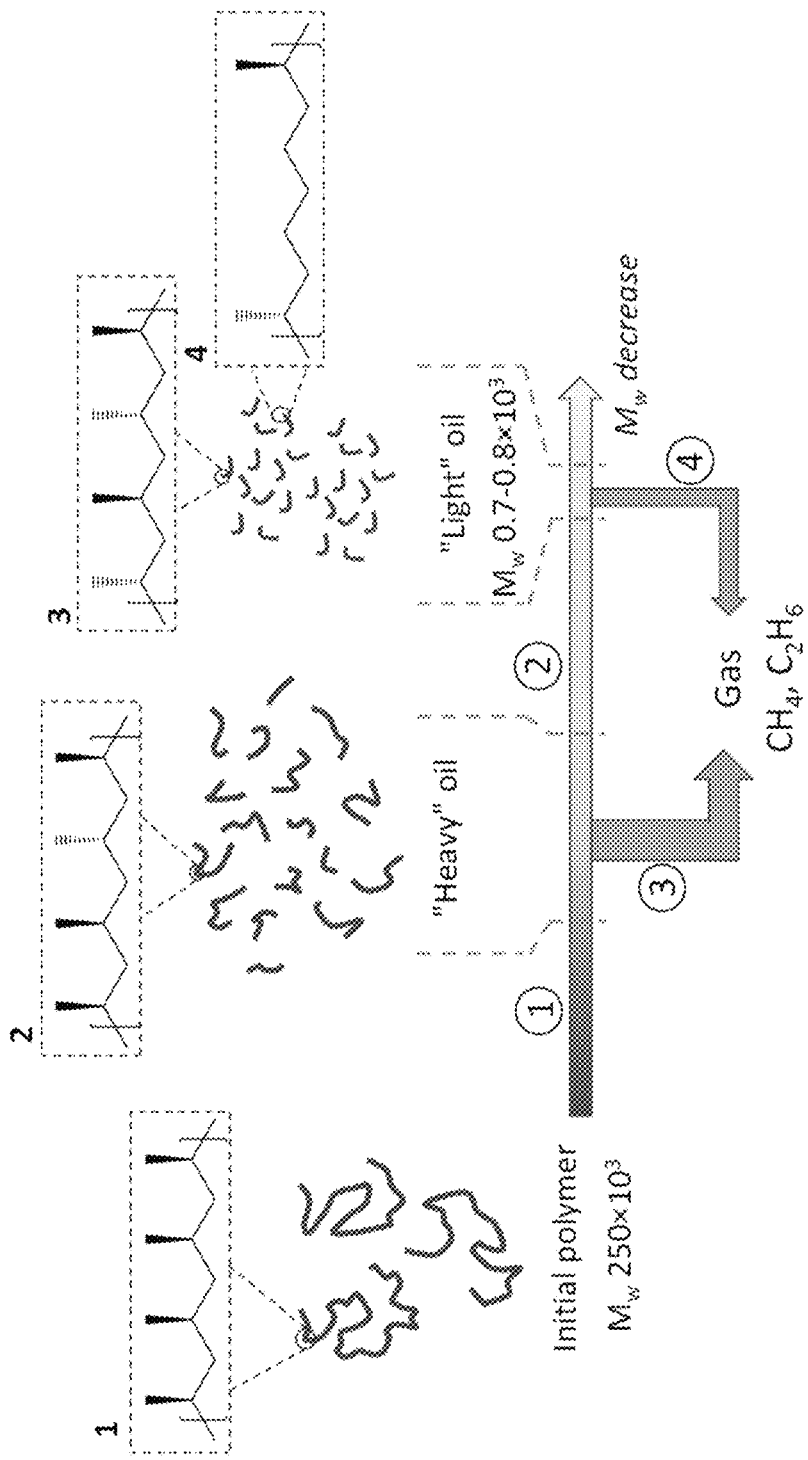
FIG. 5 shows a reaction network of successive polypropylene hydrogenolysis over $Ru/TiO_2$. The structure of the liquid products: 1—ideal i-PP sequence; 2—distortion of stereoregularity; 3—further distortion; 4—loss of $CH_3$ groups due to late-stage demethylation. The thickness of the arrows indicates the flux from each type of oil to gas.

For a low molecular weight i-PP (1-PP, M$_w$~12,000 Da), the solid drops to ca. 15% in 3 h with a high liquid yield above 80%. At longer reaction times, the overall mass yields are almost stable with minor production of gas. In the same timescale, the M$_w$ and M$_n$ of the oil decrease to values characteristic of i-PP (Table 5). Due to the low molecular weight of 1-PP, the heavy oil (stage 1 in FIG. 5) is absent. So, the reaction entails the direct conversion of the melt to light oil (stage 2 in FIG. 5). In amorphous PP (a-PP), two-thirds of the polymer are converted to liquid in 3 h with a further slow increase to 75% in 12 h. The M$_n$ decrease is slower for a-PP compared to i-PP, especially early on. PP-bags were effectively converted to oil with a yield above 70% (FIG. 6c). Polystyrene additive can cause a somewhat lower oil yield for the PP-bottle. The product molecular weight distribution from all plastics resembles that of the model i-PP, i.e., the liquid products are practically independent of the initial polymer structure.

Example 6

Prepare Light and Heavy Lubricants

Light and heavy lubricants were prepared under reaction conditions: 250° C., 16 h, 30 bar H$_2$, 2 g of i-PP. Light lubricant: 100 mg Ru/TiO$_2$; heavy lubricant: 50 mg Ru/TiO$_2$. Table 6 summarizes the reaction yields and lubricants' properties.

TABLE 6

| Reaction Product | Yields | | | Lubricant properties | | | |
|---|---|---|---|---|---|---|---|
|  | Gas | Lubricants | Solid residue | $M_w$, kDa | $M_n$, kDa | PDI | Viscosity at 100° C. |
| Light Lubricant | 28.2 | 65.6 | 6.4 | 0.90 | 0.68 | 1.3 | 6.2 |
| Heavy Lubricant | 12.5 | 58.1 | 19.8 | 8.97 | 3.21 | 2.8 | 42.2 |

Example 7

Lubricant Property Comparison of Plastic Conversion Products Quantitatively to Standard Commercial Products Table 7 compares the lubricant properties of plastic conversion products quantitatively to standard commercial products.

TABLE 7

| Sample | KV40, cSt[a] | KV100, cSt[a] | VI[b] | Pour point, ° C. | DSC oxidation onset temperature, ° C. |
|---|---|---|---|---|---|
| Light lubricant | 30.3(±0.2) | 6.2(±0.1) | 146(±7) | −15 | 179 |

TABLE 7-continued

| Sample | KV40, cSt[a] | KV100, cSt[a] | VI[b] | Pour point, °C. | DSC oxidation onset temperature, °C. |
|---|---|---|---|---|---|
| Heavy lubricant | 113.5(±0.8) | 42.2(±0.3) | 149(±7) | −18 | 175 |
| Chevron PAO6[e] | 30.8 | 5.9 | 139 | −62 | 246 |
| Canon No35 standard[f] | 32.8(±0.2) | 5.7(±0.1) | 114(±5) | −15 | 209 |

[a]KV100 and KV40 are kinematic viscosities at 100° C. and 40° C., respectively.
[b]VI: viscosity index calculated from KV100 and KV40.
[e]Commercial PAO6 synthetic base oil manufactured by Chevron.
[f]Viscosity standard. The properties of commercial products were obtained from the specifications datasheet disclosed by the manufacturers. Reaction conditions: 250° C., 16 h, 30 bar $H_2$, 2 g of i-PP. Light lubricant: 100 mg Ru/TiO$_2$; heavy lubricant: 50 mg Ru/TiO$_2$.

A higher viscosity index (VI) reflects a smaller dependence of lubricant's viscosity on temperature. Generally, an oil with a higher VI is desirable due to having a stable lubricating film over a wide temperature range. The VI is below 120 for Group I-III mineral oil and higher for synthetic lubricants. The plastics-derived base oils show an overall higher viscosity than polyolefin (PAO) commercial analog, but a higher VI. The pour point of base oils is higher than that of the commercial PAO. Both the heavy and light oils have VI values well above the typical mineral oil threshold.

Example 8

Plastic Conversion Over Catalysts with Different Metals 2 g of polypropylene was mixed with 0.1 g of 4% Ru/SiO$_2$, 0.1 g of 15% Ni/SiO$_2$, and 0.1 g of 15% Co/SiO$_2$ in three reaction vessels, respectively. Each reaction vessel was heated to 300° C. for 2 hours under 30 bar of hydrogen (except for Ru/SiO$_2$) The reaction conversion and product distribution are summarized in Table 8 below.

TABLE 8

| Metal | Catalyst composition | Yields | | |
|---|---|---|---|---|
| | | Gas | Lubricants | Solid residue |
| Ru | 4% Ru/SiO$_2$ * | 30.8 | 45.5 | 19.4 |
| Ni | 15% Ni/SiO$_2$ | 9.3 | 49.4 | 39.7 |
| Co | 15% Co/SiO$_2$** | 20.9 | 6.7 | 63.1 |

* 250° C., 6.5 h,
**was used polyethylene.

Example 9

Plastic Conversion Over Catalysts with Different Support Materials 2 g of plastic polypropylene was mixed with 0.1 g of 4% Ru/C, 0.1 g of 4% Ru/SiO$_2$, 0.1 g of 4% Ru/Al$_2$O$_3$, 0.1 g of 4% Ru/CeO$_2$, 0.1 g of 4% Ru/TiO$_2$, and 0.1 g of Ni nanopowder in six reaction vessels, respectively. Each reaction vessel was heated to 250° C. for 5 hours under 30 bar of hydrogen. The reaction conversion and product distribution are summarized in Table 9 below.

TABLE 9

| Supporting Material | Catalyst | Yields (%) | | |
|---|---|---|---|---|
| | | Gas | Lubricants | Solid residue |
| carbon | 4% Ru/C | 36.2 | 41.0 | 23.1 |
| silica | 4% Ru/SiO$_2$ | 30.8 | 45.5 | 19.4 |
| alumina | 4% Ru/Al$_2$O$_3$ | 26.8 | 28.8 | 13.0 |
| ceria | 4% Ru/CeO$_2$ | 30.5 | 45.1 | 18.7 |
| titania | 4% Ru/TiO$_2$ | 16.4 | 47.7 | 28.7 |
| no support | Ni metal powder * | 0.6 | 3.8 | 90.0 |

* 300° C., 2 h, feedstock polyethylene.

Example 10

Plastic Conversion Over Catalysts with Different Reaction Temperatures

Four reactions were prepared for evaluating the reaction temperature effects on the plastic conversion to lubricants with catalysts of the present disclosure. The reaction conditions, conversion, and product distribution are summarized in Table 10 below.

TABLE 10

| Reaction Temperature, °C. | Catalyst | Yields | | |
|---|---|---|---|---|
| | | Gas | Lubricants | Solid residue |
| 220 | 4% Ru/C | 8.2 | 13.2 | 76.6 |
| 270 | 4% Ru/C | 38.5 | 41.3 | 18.8 |
| 300 | 15% Ni/SiO$_2$* | 9.3 | 49.4 | 39.7 |
| 320 | 15% Ni/SiO$_2$* | 12.2 | 43.8 | 33.5 |

Reaction conditions: 2 g of plastic polypropylene; 0.1 g of catalyst; 5 h, 30 bar $H_2$.
*2 h.

Example 11

Conversion of Diverse Polymer Feedstocks to Lubricants with Ni and Ru Based Catalysts Diverse feedstocks were converted into lubricants under reaction conditions: 300° C., 30 bar $H_2$, 5 hours, catalyst 15% Ni/SiO$_2$ or 4% Ru/TiO$_2$, 100 mg, substrate (plastic) 2 g. Table 11 summarizes the reaction conversion and product distribution.

TABLE 11

| Feedstock | Catalyst Composition | Yields | | |
|---|---|---|---|---|
| | | Gas | Lubricants | Solid Residue |
| Polyethylene | 15% Ni/SiO$_2$ | 10.9 | 49.3 | 36.1 |
| High density polyethylene | 15% Ni/SiO$_2$ | 5.9 | 6.5 | 86.9 |
| Polypropylene (M$_w$ 12 kDa) | 15% Ni/SiO$_2$ | 19.1 | 73.2 | 4.6 |
| Polypropylene (M$_w$ 250 kDa) | 15% Ni/SiO$_2$ | 6.1 | 60.2 | 24.5 |
| Polypropylene (amorphous) | 4% Ru/TiO$_2$ | 15.2 | 74.3 | 9.5 |
| Polystyrene | 15% Ni/SiO$_2$ | 0.5 | 91.9 | 7.5 |
| Polyethylene bottle* | 15% Ni/SiO$_2$ | 20.6 | 50.8 | 25.3 |
| Polypropylene cap* | 15% Ni/SiO$_2$ | 17.3 | 79.2 | 3.0 |

*12 h.

Example 12

Catalyst Regeneration

For the reusability test, Ru/TiO$_2$ was first used in a regular run at 250° C. for 16 h with a polymer/catalyst ratio of 20 (results shown in FIG. 2a). After the reaction, the catalyst and a small amount of solid residue were filtered and dried at room temperature overnight. Then, the powder was transferred to a tubular furnace and reduced in flow of 50% H$_2$/He mixture at 300° C. for 2 h (ramp rate 10°/min).

Figure 7:
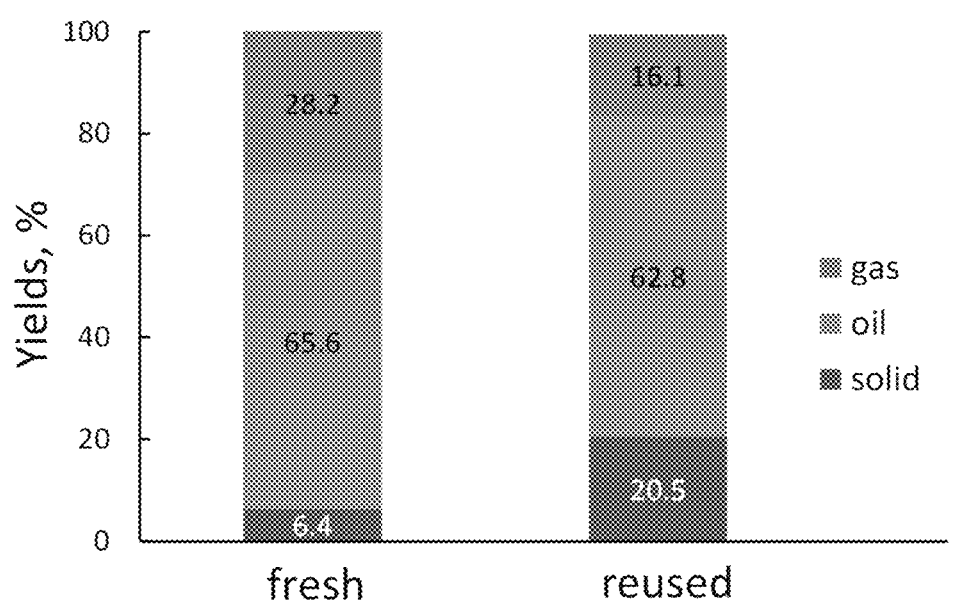
FIG. 7 shows yields of major products using fresh and reused Ru/TiO$_2$ catalysts. Reaction conditions: 250° C., 30 bar H$_2$, 2 g i-PP, 100 mg catalyst.

Upon regeneration by reduction in hydrogen, the catalyst activity is recovered, giving the comparable oil yield produced by a fresh catalyst (FIG. 7).

Example 13

Structure of Lubricant Products

Figure 8:
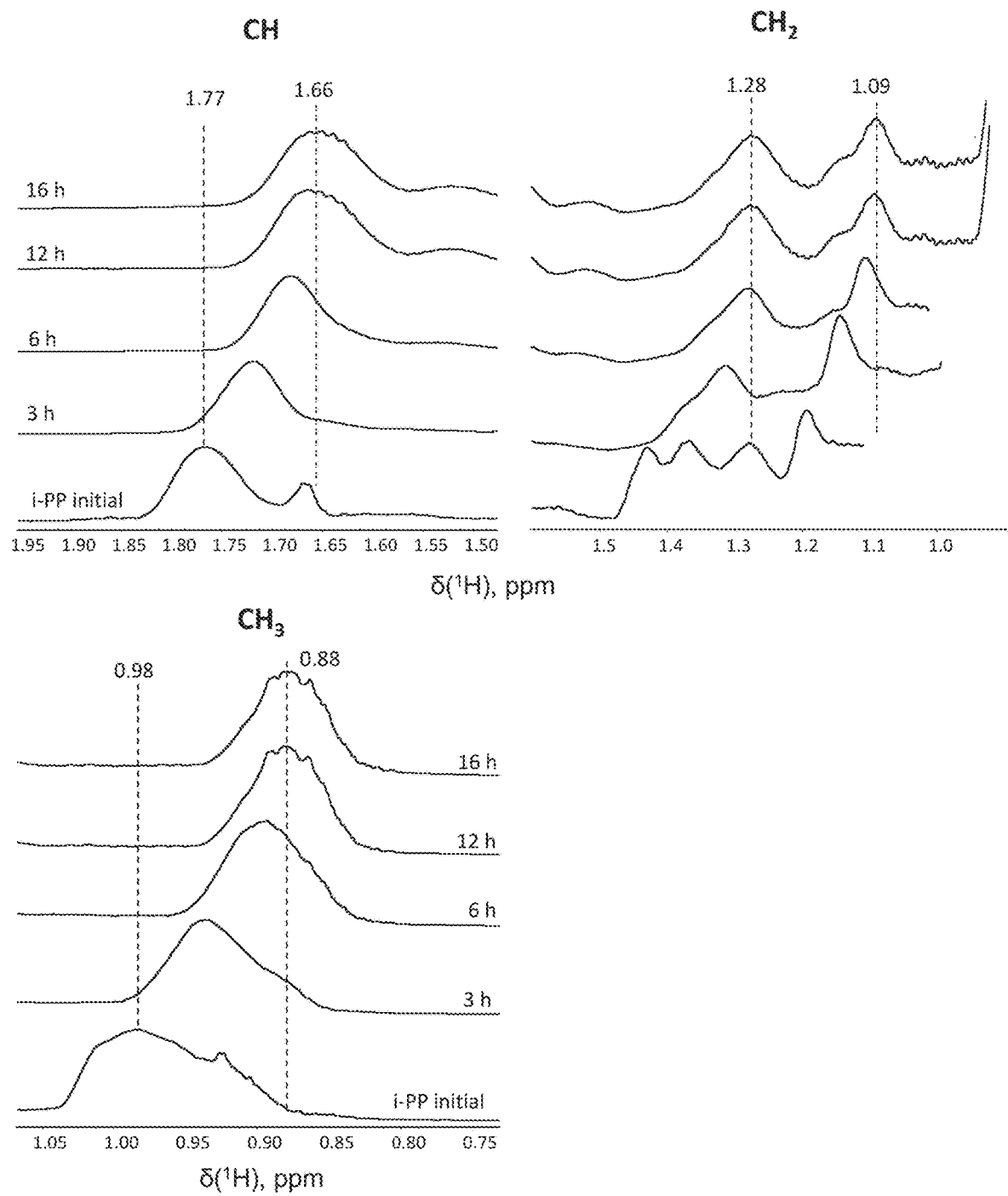
FIG. 8 shows $^1$H NMR spectra of initial i-PP and oil products produced over the Ru/TiO$_2$ catalyst.
Figure 11:
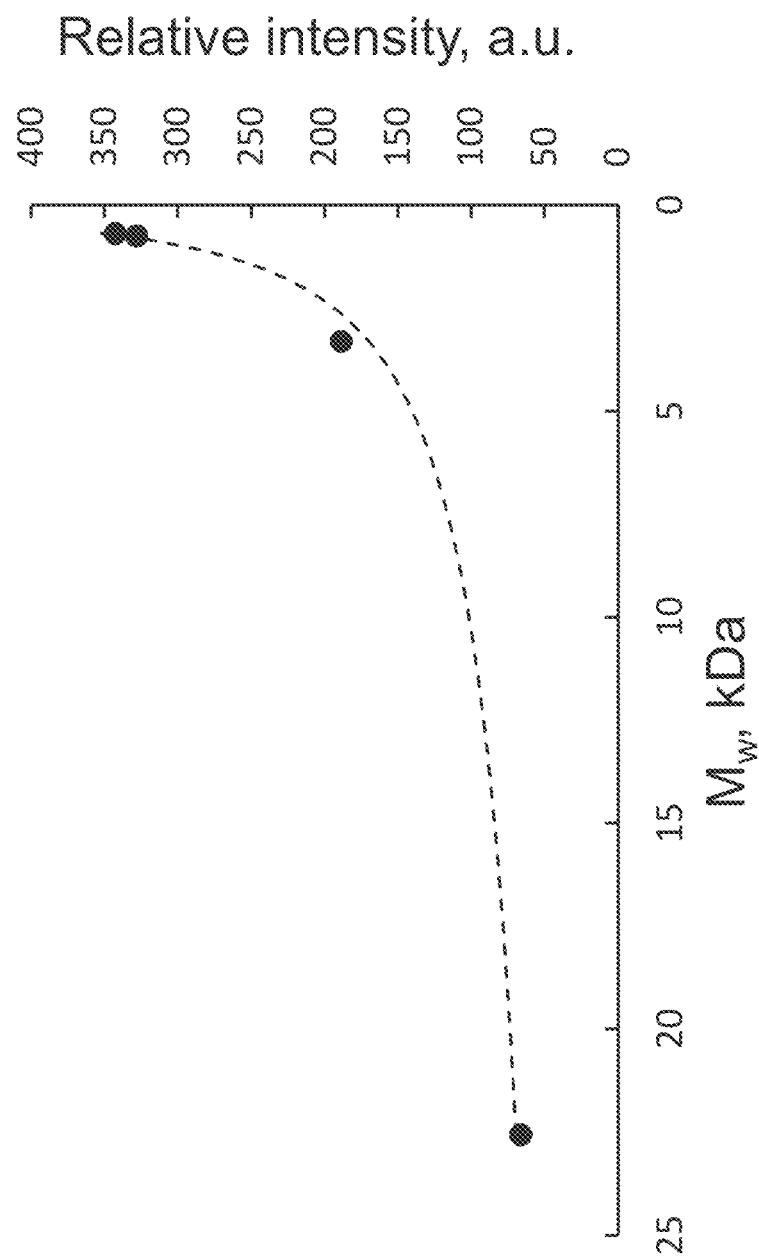
FIG. 11 shows relative intensity of chain ends in $^{13}$C NMR spectra depicted on FIG. 9 (region 2 in panel c) vs. weight average molecular weight of the liquid, determined by GPC.
Figure 12:
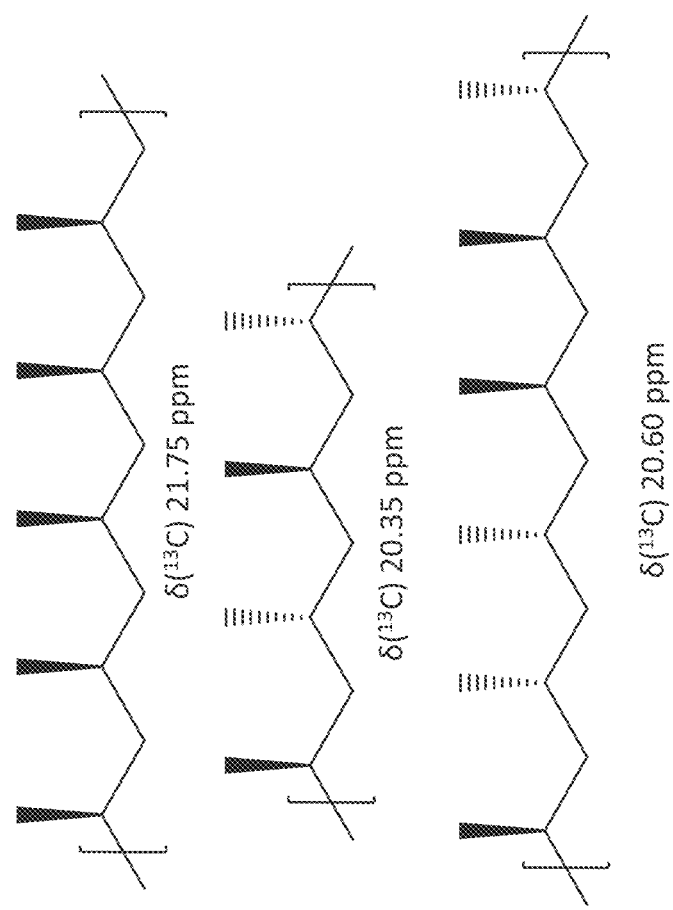
FIG. 12 shows examples of peak assignment to stereoregular sequences with corresponding chemical shifts of methyl carbons.

Liquid samples produced over Ru/TiO$_2$ with a polymer/catalyst ratio of 20 were selected for a detailed structural study. NMR spectroscopy has been employed for characterizing the polypropylene microstructure, some of its oligomers, and the lubricant oil. $^1$H NMR spectra of liquid products consist of three regions associated with the CH, CH$_2$, and CH$_3$ groups (FIG. 8). The liquid product spectra deviate significantly from the initial i-PP, indicating that the oil is not merely a short-chain oligomer of i-PP. $^{13}$C NMR with proton decoupling and 2D $^{13}$C-$^1$H HSQC NMR (FIGS. 9a-d, 10, 11), which are sensitive to the monomer sequence and the overall structure of long paraffins, were employed. Three main functional groups were observed in both spectra, similar to the initial i-PP, consistent with the $^1$H NMR results (FIG. 8). In the CH resonance region, after 3 h of reaction, most peaks shift from 28.2 ppm (typical for CH in the ideal i-PP chain) to lower values. The PP chain conformation deviates from the perfect isotactic sequence with more randomly oriented CH$_3$ groups leading to peak shifting upfield, typical for amorphous PP. The intermediate peaks centered at ca. 27.9 ppm reflect the different sequences of non-equivalent steric pentads with some combination of meso and racemo configurations (FIG. 12). Interestingly, the isotactic sequence distortion observed already after 3 h indicates that the liquid product possesses substantial configurational reorientation of CH$_3$ groups in addition to C—C bond breaking.

Figure 9A:
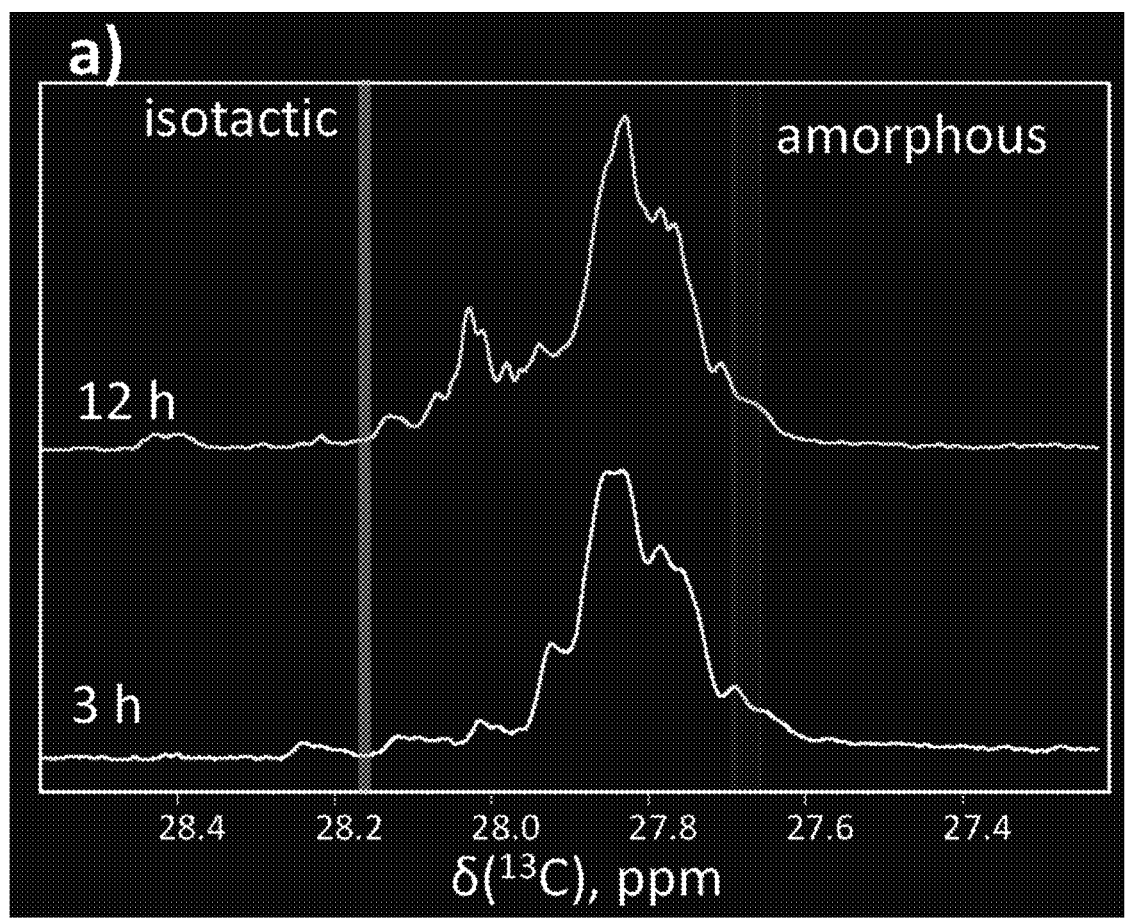
FIG. 9a shows $^{13}$C NMR spectra of CH group after 3 and 12 h reaction.
Figure 9B:
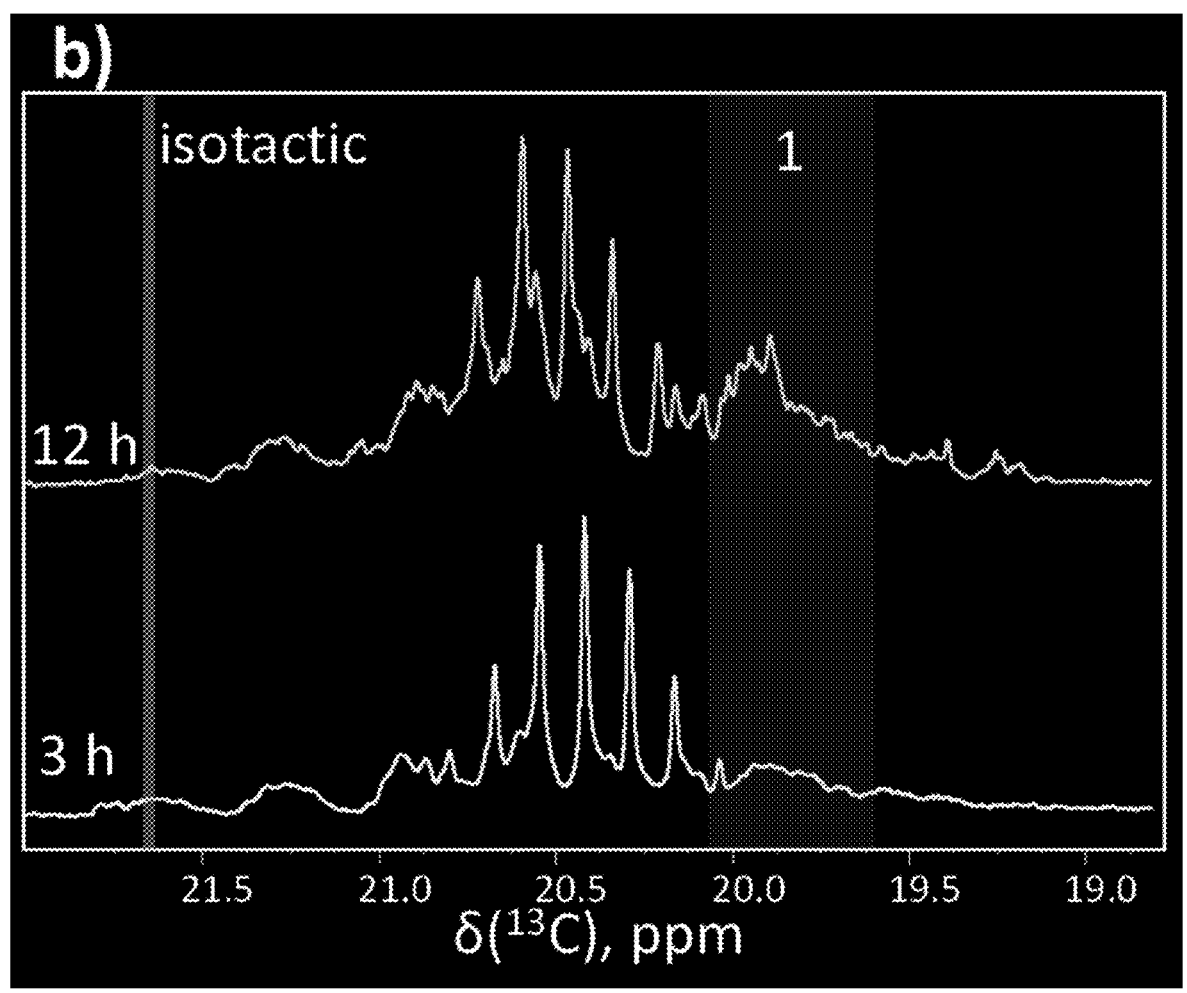
FIG. 9b shows $^{13}$C NMR spectra of CH$_3$ group after 3 and 12 h reaction.

In the CH$_3$ region, a similar deviation from the standard i-PP spectra is clearly seen (FIG. 8). The CH$_3$ group signal at 21.75 ppm in i-PP disappears, giving rise to at least 6-7 new resonances, typical for stereospecific pentads with more random orientation of CH$_3$ groups. Beyond the elimination of isotacticity, the data shows a broad signal at ca. 20.0 ppm at long reaction times due to CH$_3$ group attached to the (CH$_2$)$_n$ backbone (FIGS. 9b and 9e). The NMR results indicate the stereoregular CH$_3$ orientation in the PP is completely disrupted in the oil.

Figure 9C:
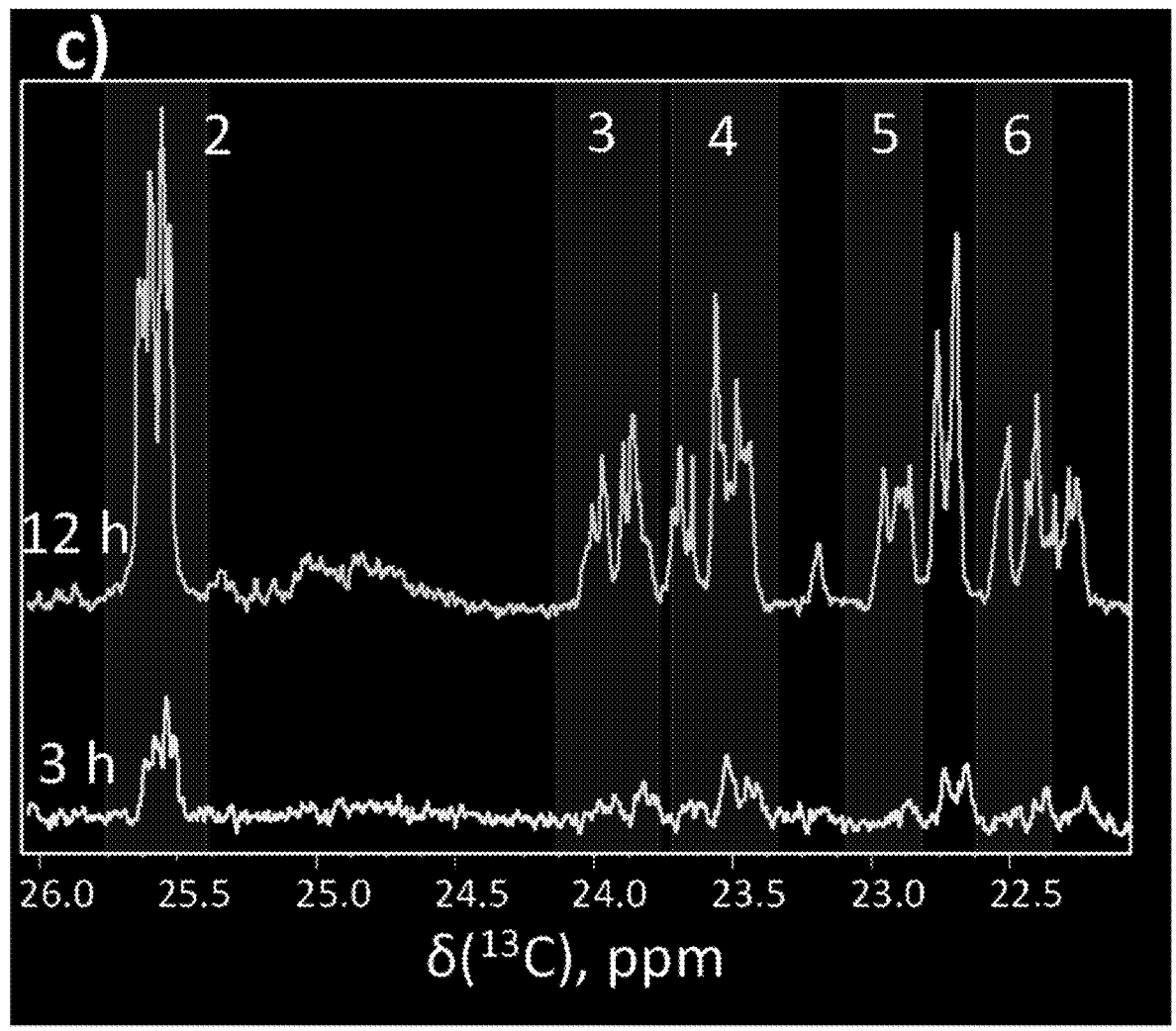
FIG. 9c shows $^{13}$C NMR spectra of liquid products in the 26-22 ppm region after 3 and 12 h reaction.
Figure 9D:
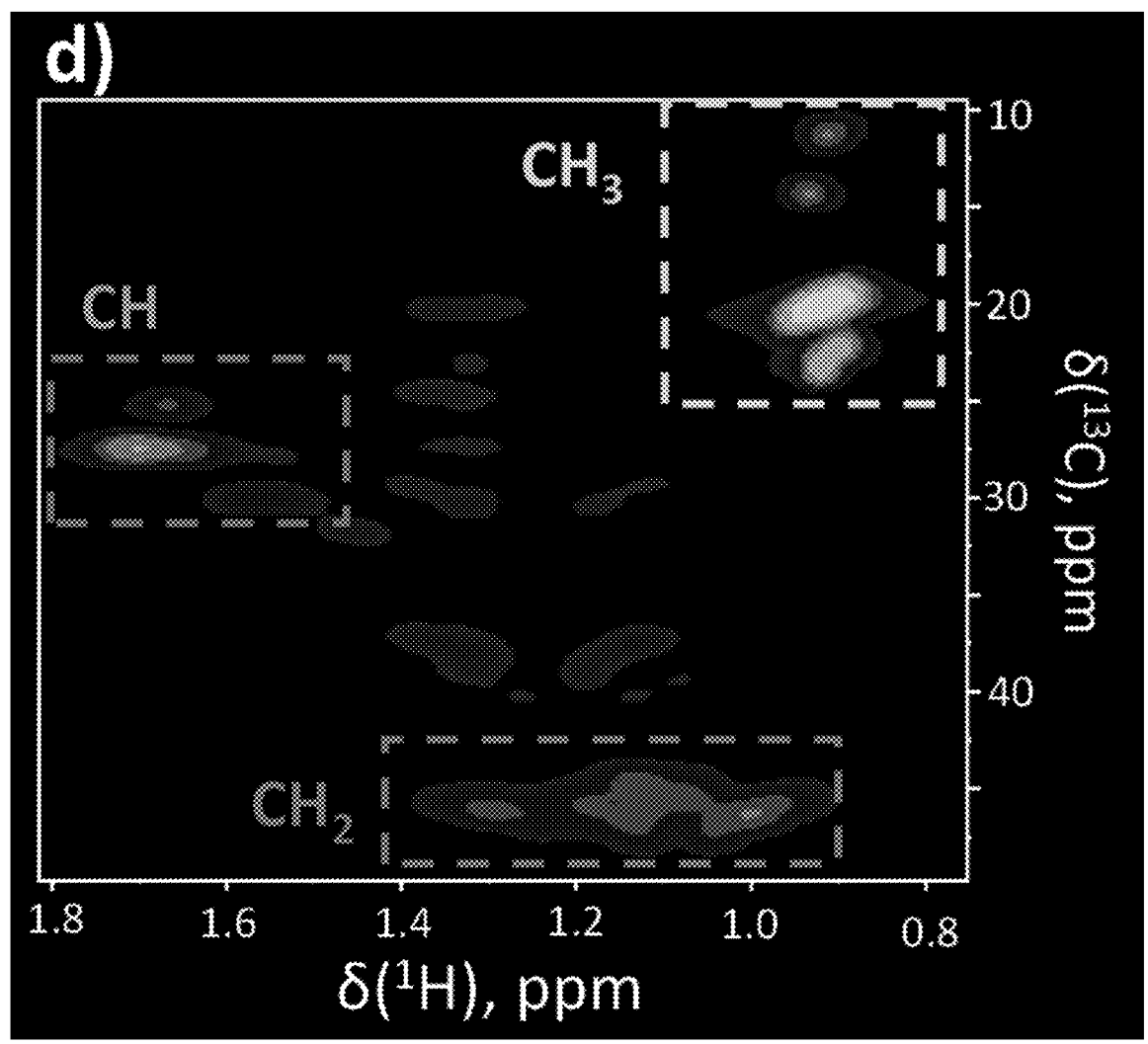
FIG. 9d shows $^{13}$C-$^1$H HSQC NMR of liquid after 12 h reaction.
Figure 9E:
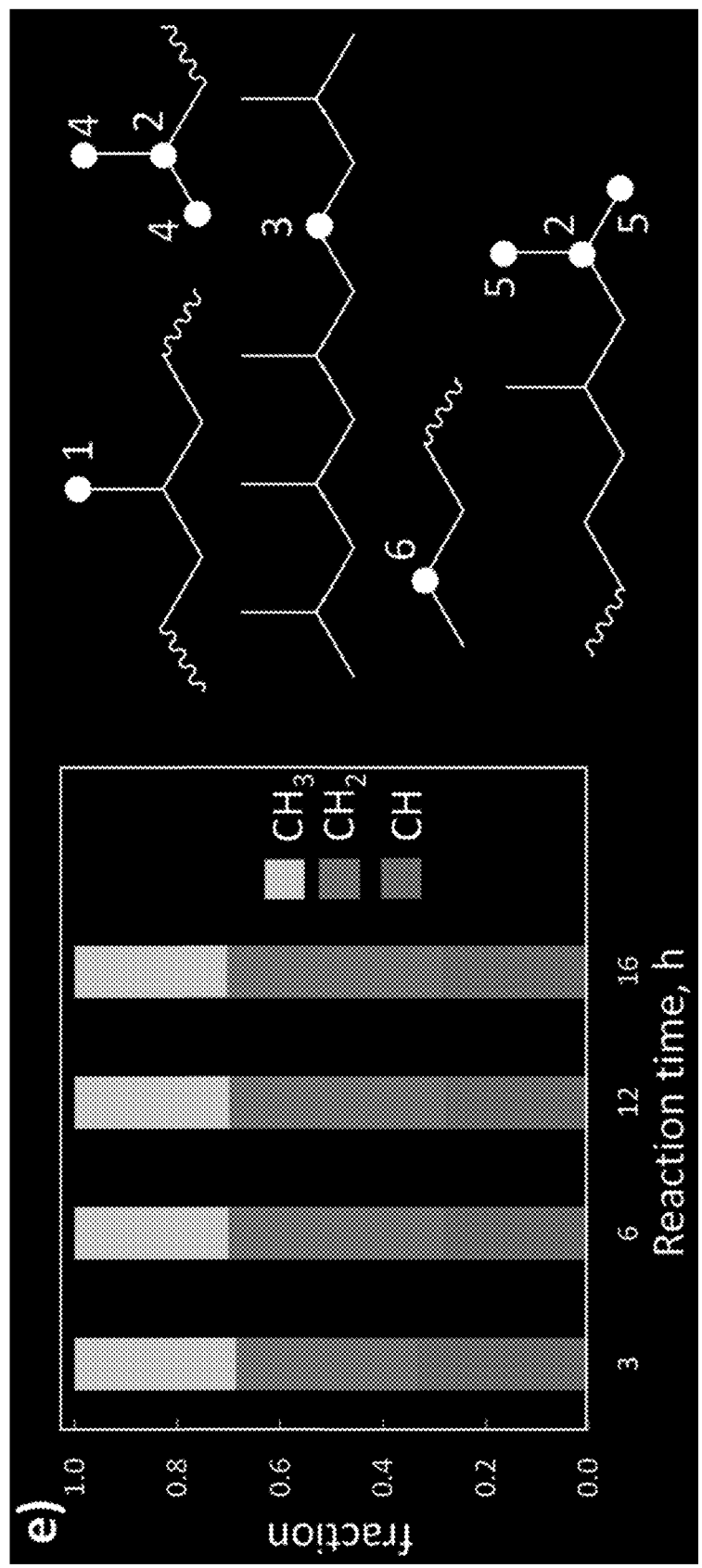
FIG. 9e shows distribution of different CH$_x$ groups calculated from NMR.
Figure 9F:
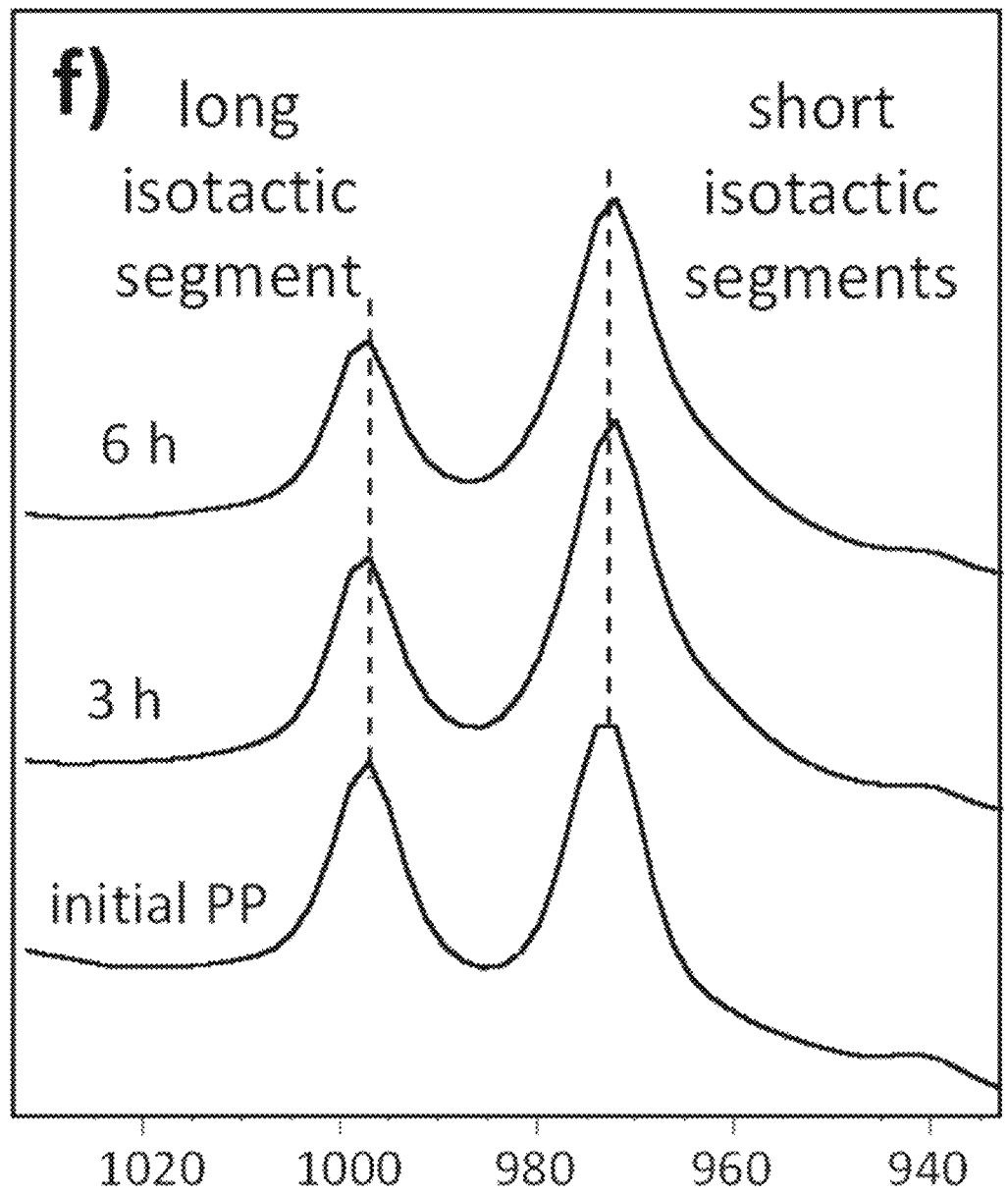
FIG. 9f shows ATR-IR spectra of solid residue in the 940-1020 cm$^{-1}$ region.
Figure 9G:
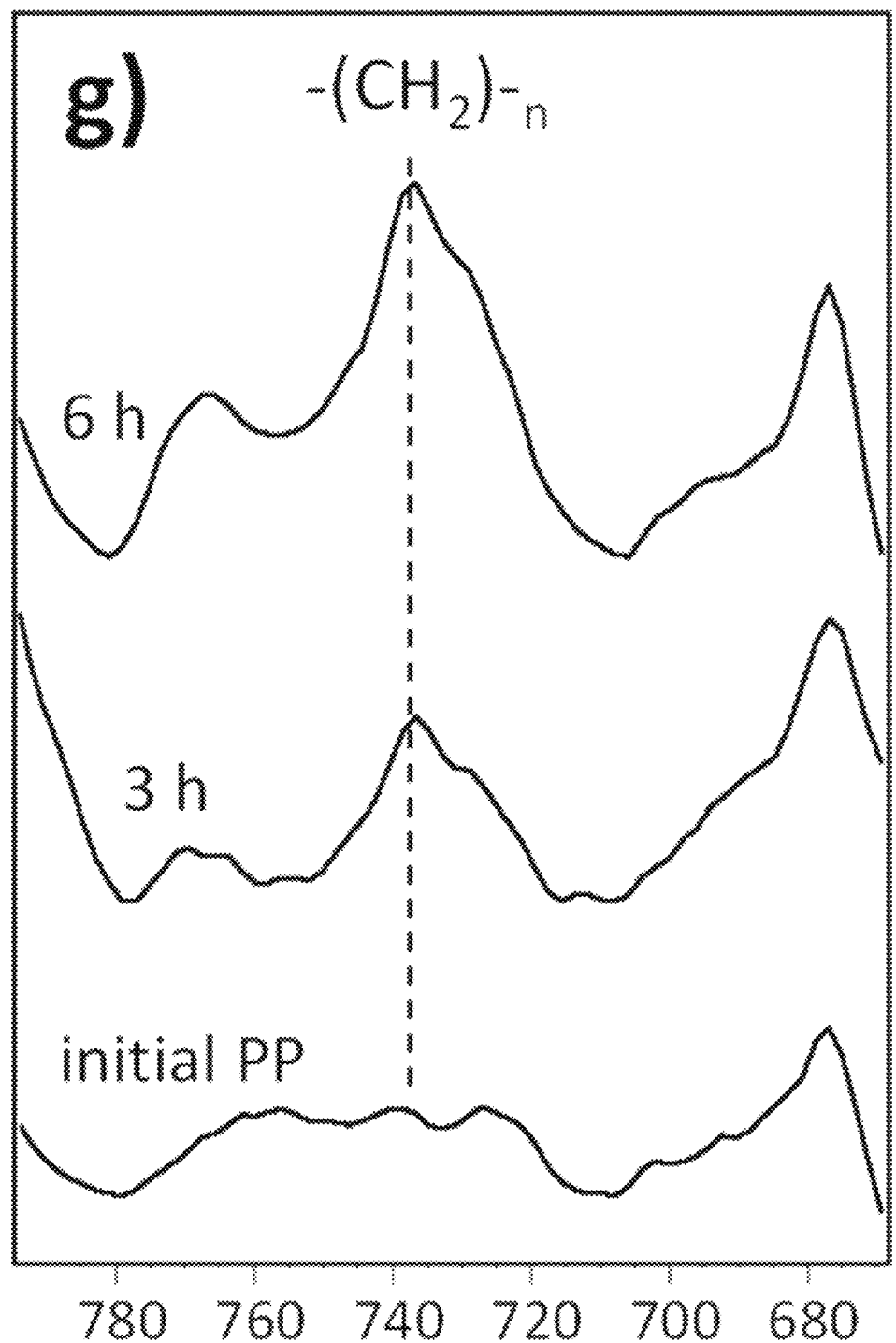
FIG. 9g shows ATR-IR spectra of solid residue in the 670-790 cm$^{-1}$ region.
Figure 13:
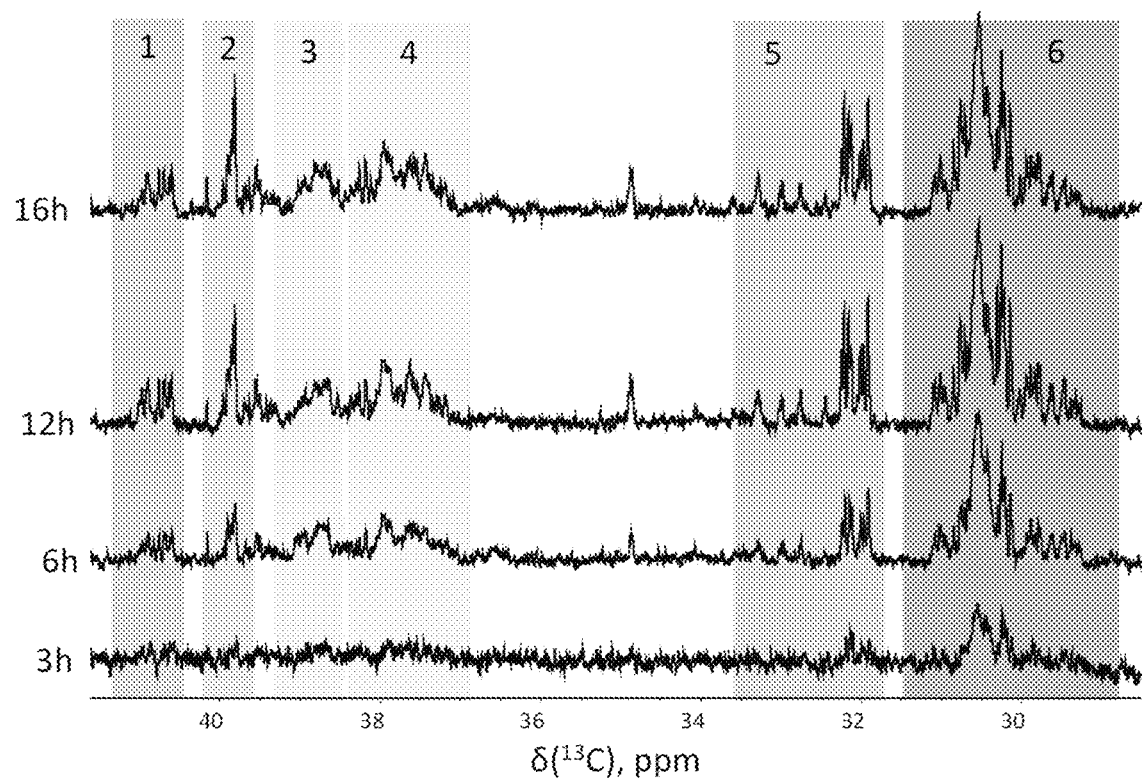
FIG. 13 shows $^{13}$C NMR spectra of the oil in the 42-29 ppm region with major peaks assignment.
Figure 13:
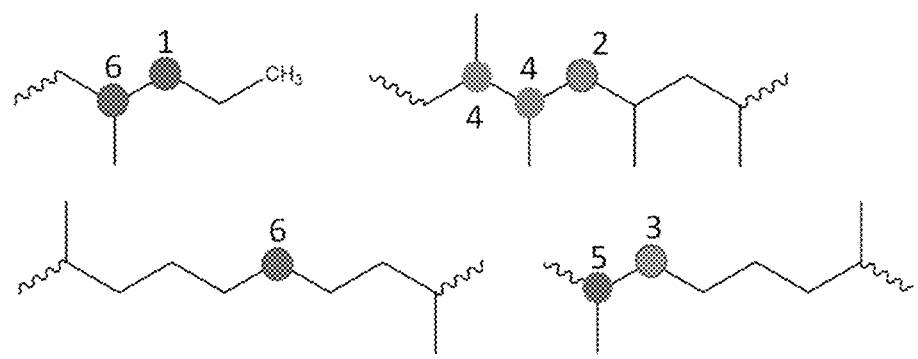
Figure 14:
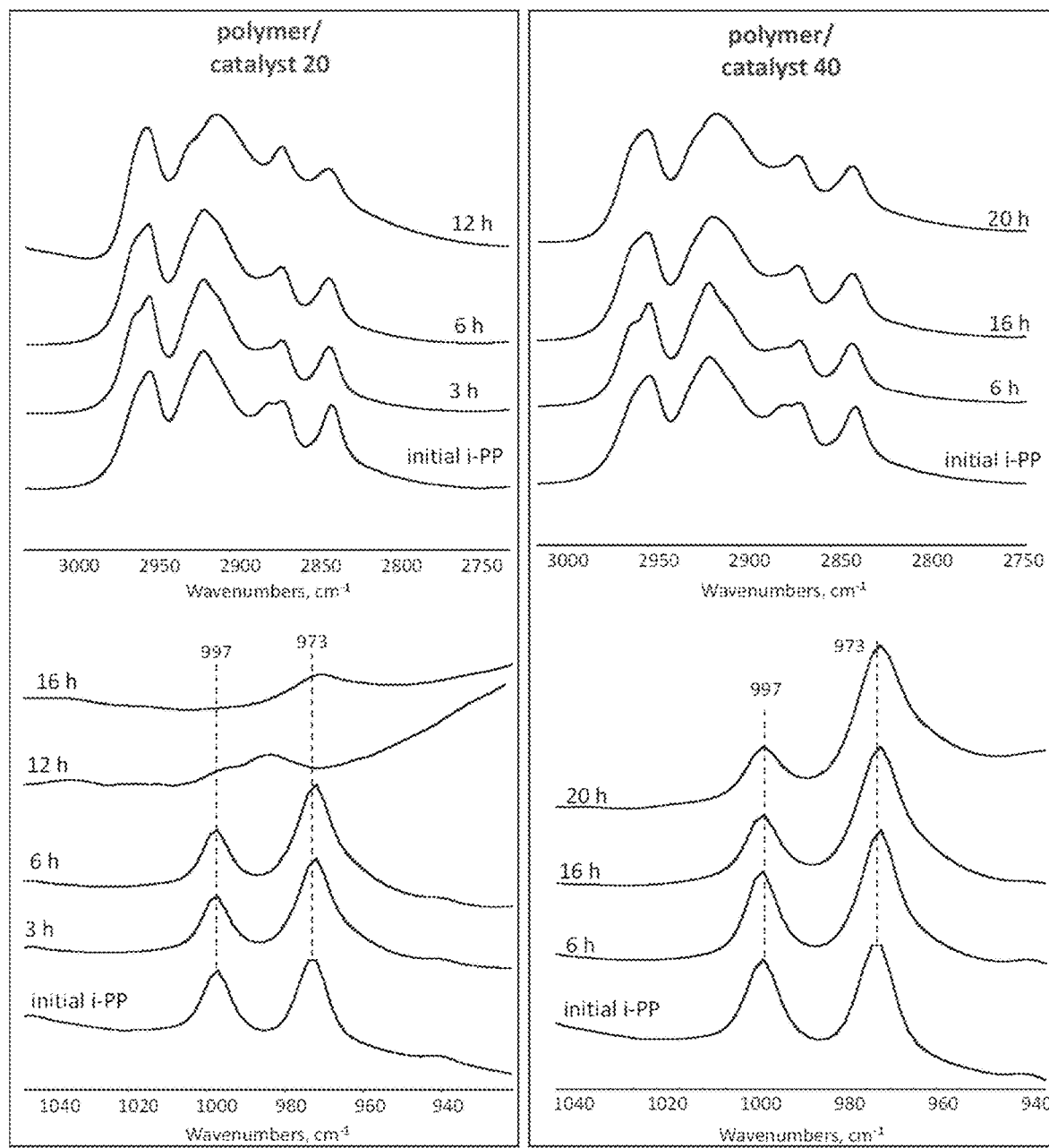
FIG. 14 shows ATR-IR spectra of initial i-PP sample and solid residue after the reaction (top—CH streatching region, bottom—isotactic chain vibration region). Conditions: 250° C., 30 bar H$_2$, catalyst Ru/TiO$_2$ 0.1 g (polymer/catalyst ratio 20) or 0.05 g (polymer/catalyst ratio 40), polymer 2 g.

FIG. 9c shows additional $^{13}$C resonances due to demethylated fragments of the liquid products, untypical of stereoregular PP. The resonances (3 in FIG. 9c) at ca. 24.0 ppm correspond to a (CH$_2$)$_3$ sequence in the middle of regular PP due to the breaking of one CH$_3$—CH bond in the parent structure. Peaks at 23.0 ppm (2 and 5 in FIG. 9c) arise due to isobutyl groups at the end of a mixed polyethylene-polypropylene chain. The bands due to the PP chain end groups (2 and 4 in FIG. 9c) increase in intensity over time in line with the molecular weight decline (FIG. 11). Ethyl groups at chain-ends give rise to peaks at ca. 22.5 ppm. Due to the partially demethylated polymer, other resonances are seen in the 40-30 ppm range in FIG. 13. Quantitative analysis shows that the highly branched oil formed in the first 3-6 h is less stable with a tendency for =CH—CH$_3$ bond breaking at long reaction times. Model studies with branched alkane conversion on metal surfaces reveal that branching indeed enhances their dissociation probability.

The $^1$H and $^{13}$C NMR data allows quantification of the CH$_x$ functional group fractions vs. time (FIG. 9e). This analysis does not include peaks of chain ends and demethylated fragments. After 3 h of reaction, the liquid exhibits a very similar distribution to the initial i-PP, with a 0.33 fraction for each group. The methine content drops by 15-20% at longer reaction times due to the concurrent increase in CH$_2$ with constant CH$_3$. These results show that part of the oil has a similar CH$_x$ distribution to PP, and another has demethylated fragments reminiscent of an ethylene-propylene copolymer. The molecular weight distributions (FIG. 2) and NMR results combined indicate that the heavy oil has fewer demethylated fragments than the initial i-PP and the light oil possesses an even lower fraction of CH$_3$ groups.

Figure 15:
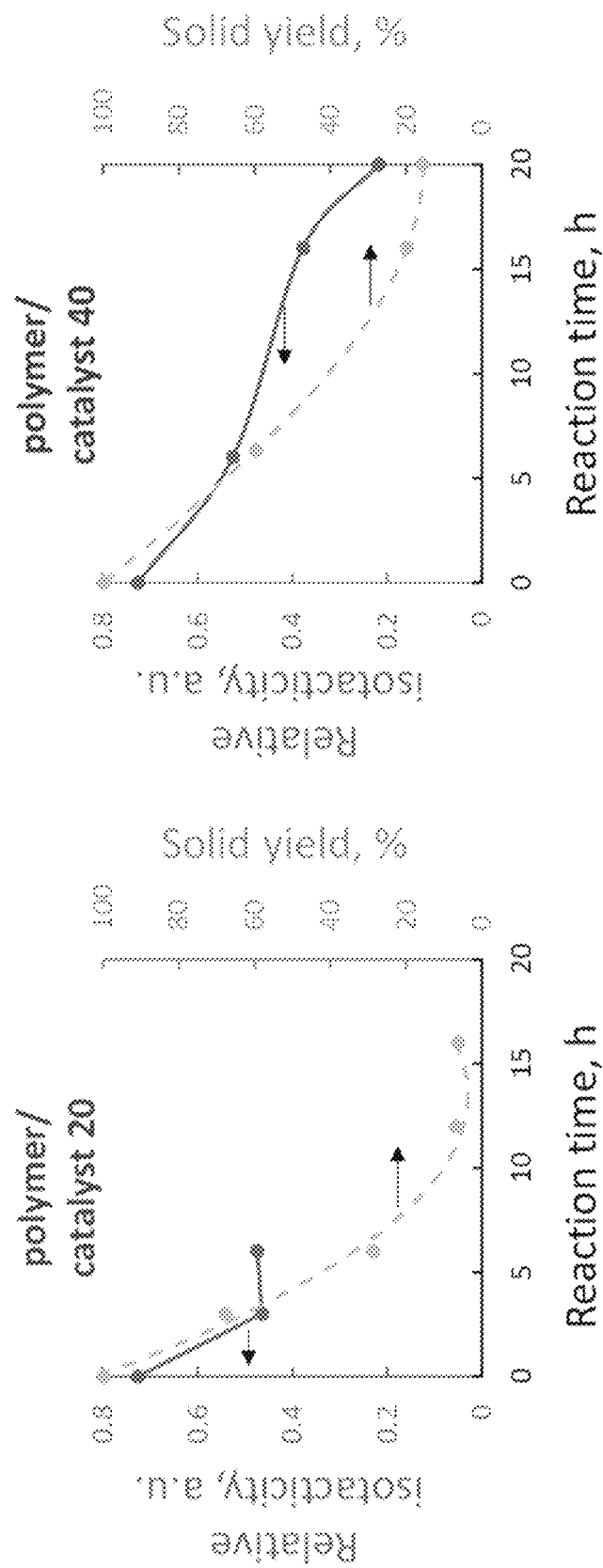
FIG. 15 shows relative isotacticity determined from ATR-IR spectra and solid yields as a function of reaction time for polymer/catalyst ratios of 20 and 40.

Attenuated total reflectance-infrared (ATR-IR) spectroscopy analysis of the solid residue shows a band at 998 cm$^{-1}$ due to 10-11 isotactic units in a segment forming a 3$_1$ helical sequence and a band at 973 cm$^{-1}$ due to shorter isotactic helixes with 2-4 monomers units. The I$_{998}$/I$_{973}$ ratio decreases by 40% in the first 3 h compared to the initial i-PP indicating loss of isotacticity in the solid residue. Interestingly, the isotacticity remains constant between 3 and 6 h of reaction where significant consumption of the melt occurs (FIG. 15. Apparently, the initial rapid changes in the solid cannot wholly eliminate isotacticity and randomly orient all CH$_3$ groups. Similar to the oil, a minor amount of relatively long (CH$_2$)$_{n>5}$ sequences appears at ca. 740 cm$^{-1}$ due to partial demethylation. No significant differences are visible in the C—H stretching region (FIG. 15), indicating a relatively similar content of various CH$_x$ groups in all solid residues. With a lower catalyst loading (FIG. 2c), the solid residue retains ca. 70% of the initial isotacticity after 6 h (FIG. 15). Since the solid reacts slower in this case, isotacticity decays relatively slowly up to 20 h.

Figure 16:
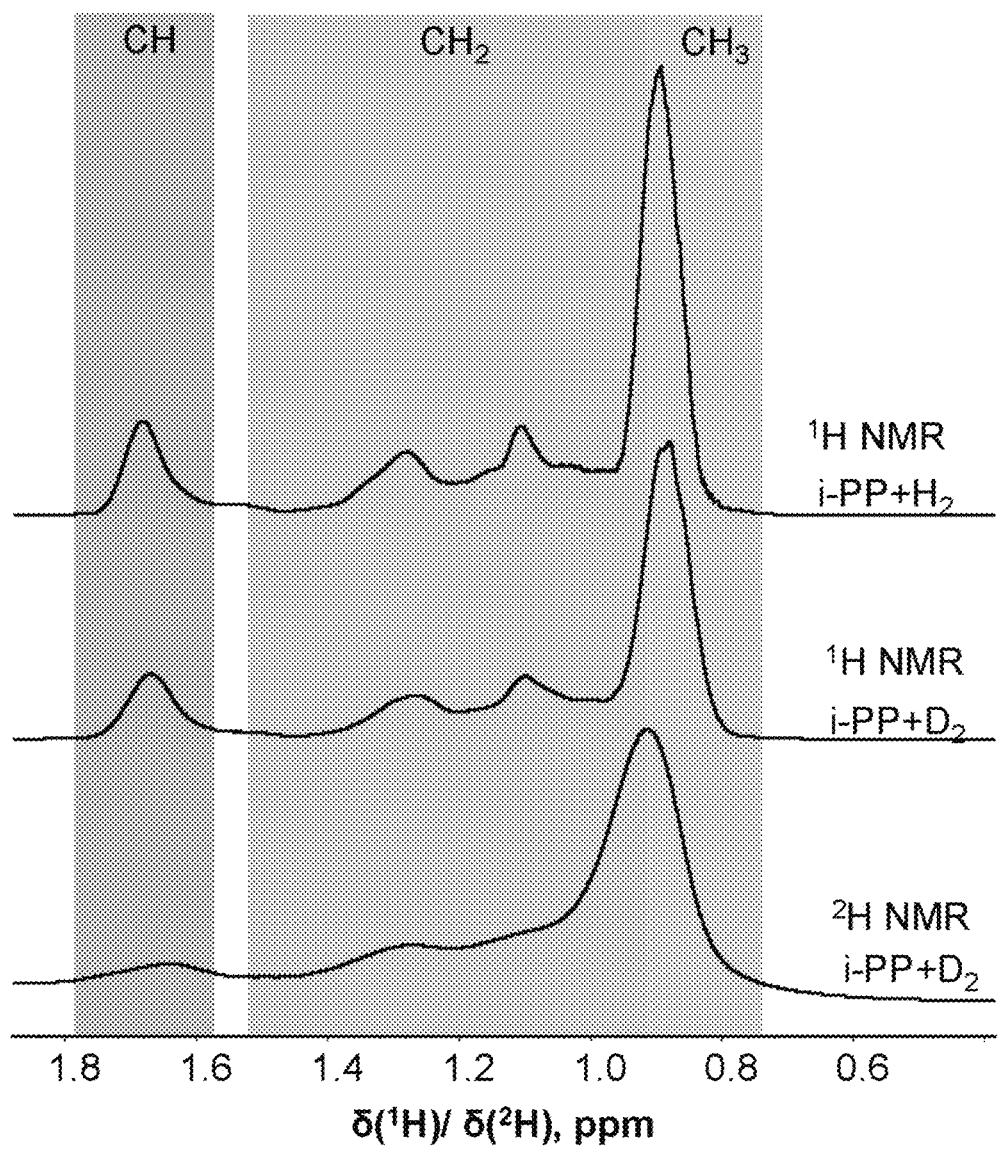
FIG. 16 shows $^1$H and $^2$H NMR spectra of oil produced from i-PP reaction with H$_2$ and D$_2$. Intensity normalized using $^1$H-benzene as an internal standard.

Alkane hydrogenolysis necessitates the dehydrogenation of the reactant. This pathway was analyzed for PP depolymerization by replacing H$_2$ gas with D$_2$ followed by ATR-IR, GCMS, $^1$H NMR, and $^2$H NMR monitoring of reaction products. Comparison of the NMR spectra of liquid products obtained with H$_2$ and D$_2$ as reactant showed that all $CH_x$ groups are evenly deuterated with 20% intensity loss in the $^1H$ spectra (FIG. 16, Table 12).

TABLE 12

| Sample | $M_w \times 10^{-3}$ g/mol | $M_n \times 10^{-3}$ g/mol | PDI | Relative peak-area for different $CH_x$ groups, a.u. | | |
|---|---|---|---|---|---|---|
| | | | | CH | $CH_2$ | $CH_3$ |
| i-PP + $H_2$ | 3.31 | 1.46 | 2.3 | 1 | 3.47 | 3.61 |
| i-PP + $D_2$ | 14.12 | 3.66 | 3.86 | 0.80 | 2.31 | 2.70 |

Quantitative analysis of GPC and $^1H$ NMR spectra of the oil produced from i-PP in the presence of $H_2$ or $D_2$. Reaction conditions: 250° C., 30 bar $H_2$ or $D_2$, 6 h reaction time, Ru/TiO$_2$ loading 100 mg, polymer loading 2 g.

Figure 17:
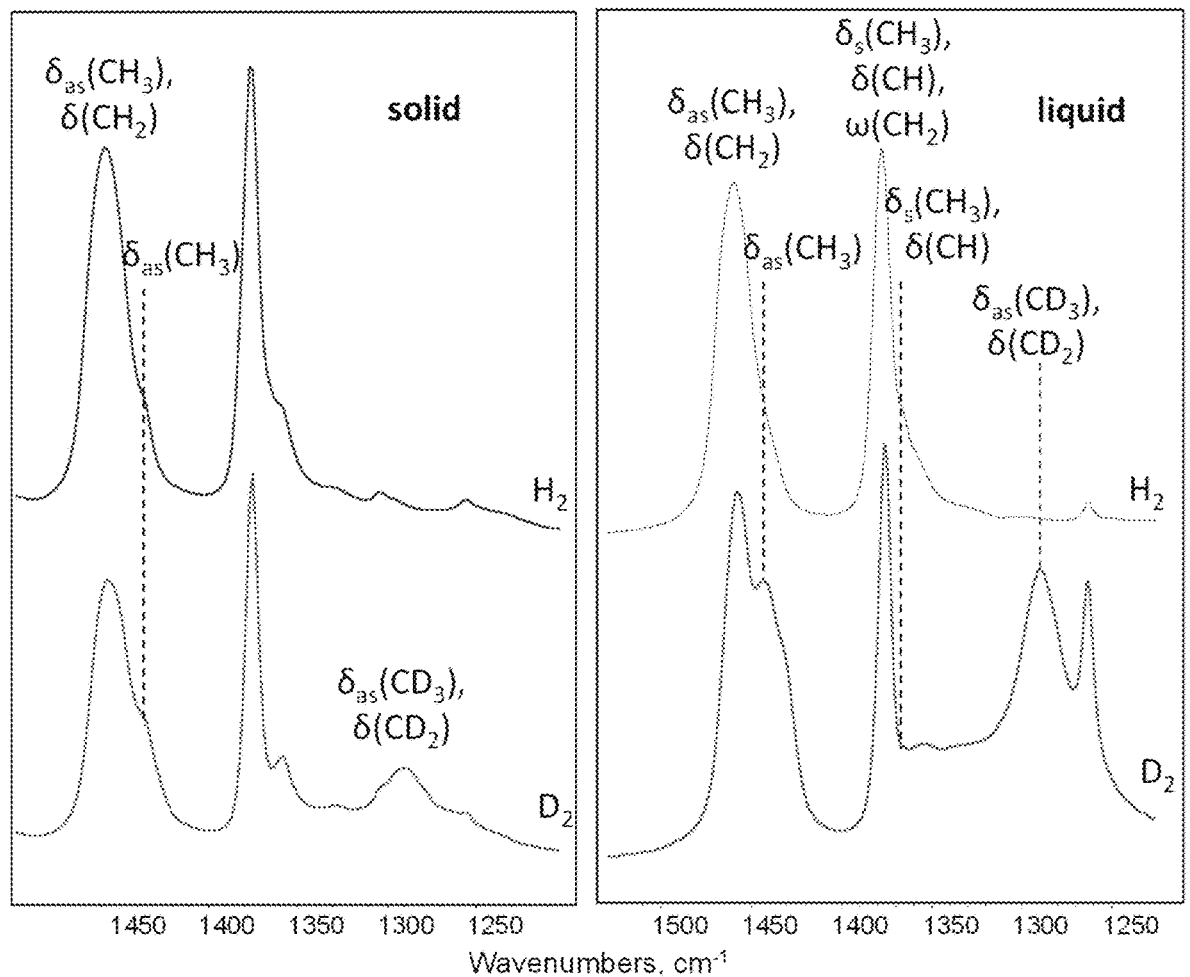
FIG. 17 shows ATR-IR spectra of solid residue and oil product in the presence of H$_2$ or D$_2$. Conditions: 250° C., 30 bar H$_2$(D$_2$), reaction time 6 h, catalyst Ru/TiO$_2$ 0.1 g, i-PP 2 g.
Figure 18:
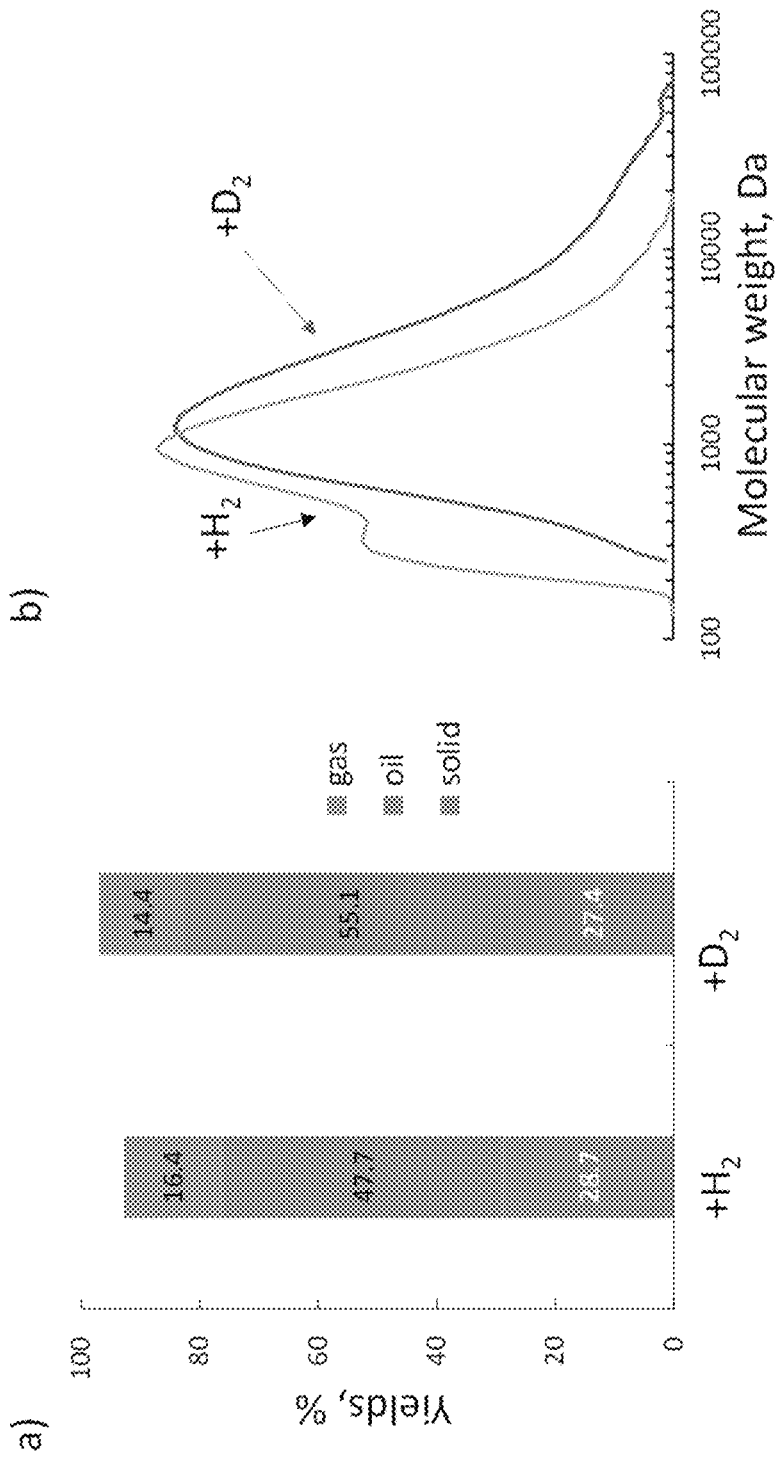
FIG. 18a shows effect of H2/D2 exchange on main product fraction yields.
FIG. 18b shows molecular weight distributions of the oil.

ATR-IR revealed the appearance of new C-D stretching (FIG. 9h) and $\delta(CD_x)$ bending (FIG. 17) vibrations in the deuterated liquid. The intensity of the $CD_3$, $CD_2$, and CD-related bands resembles the original C—H intensity distribution. The $H_2/D_2$ isotope exchange leads to nearly no effect on product yields (FIG. 18a). This indicates that $D_2$ does not affect the initial consumption of the i-PP or the gas production early in the reaction (stages 1 and 3 in FIG. 5). GPC analysis revealed a substantial increase in both the $M_n$ and PDI of the liquid produced in $D_2$ (FIG. 18b, Table 5). Thus, isotope exchange slows down the light oil production (stage 2 in FIG. 5), implicating hydrogenation/dehydrogenation steps as kinetically influential reactions.

Figure 19:
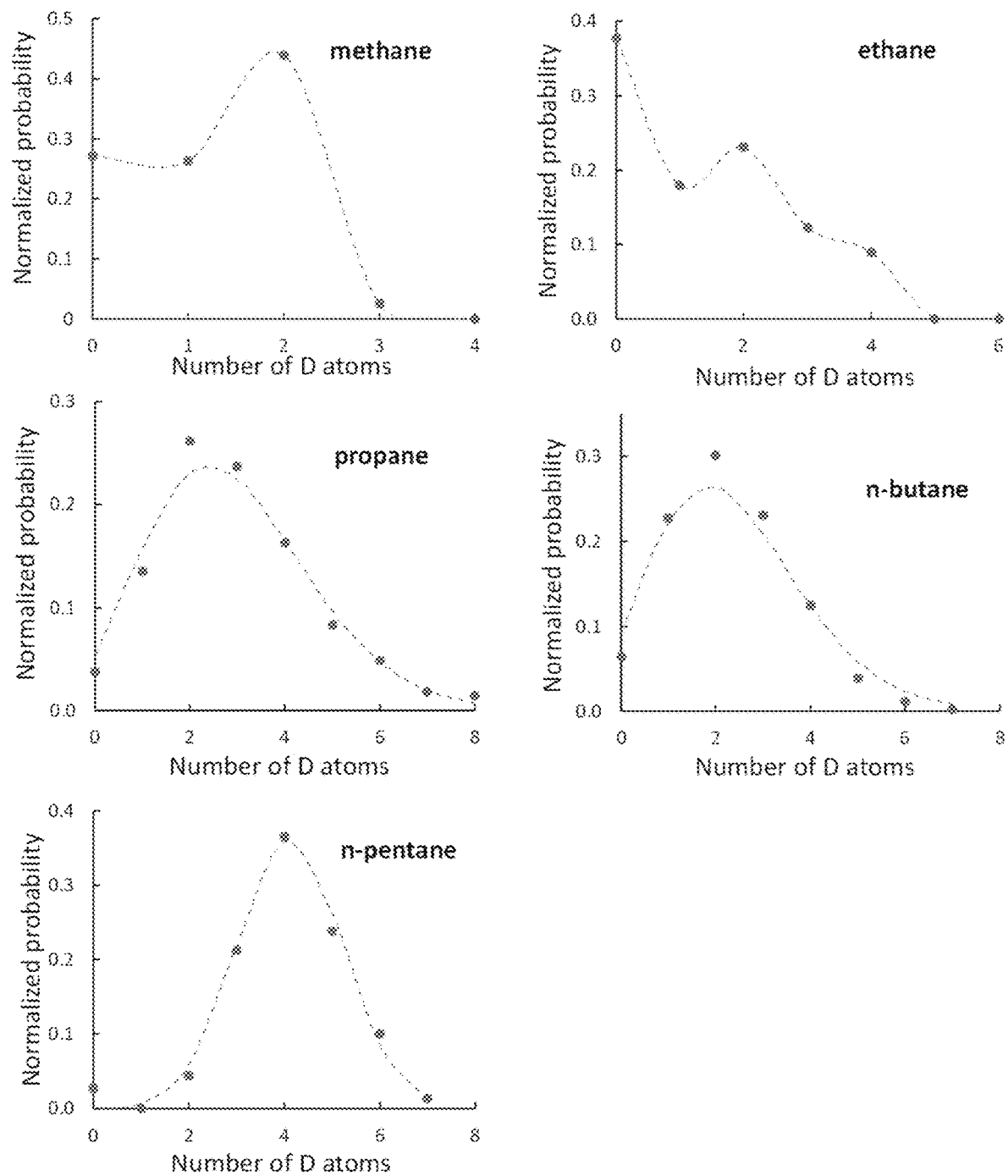
FIG. 19 shows distribution of isotopomes in gaseous products after i-PP hydrogenolysis with D$_2$. Dots represent experimental data, dashed line—fitting by Poison (C$_3$-C$_4$) or Gaussian (C$_5$) distributions. Conditions: 250° C., 30 bar D$_2$, reaction time 6 h, Ru/TiO$_2$ catalyst 0.1 g catalyst, 2 g i-PP.

According to GCMS analysis (FIG. 19), $CH_2D_2$ and $C_2H_4D_2$ are the preferred isotopomers of methane and ethane, respectively. Other gaseous products ($C_3$-$C_5$) reveal a statistical distribution of deuteration (FIG. 19). The probability to get N deuterons in a molecule is fitted by a Poisson distribution. The average numbers of deuterons were 2.9, 2.4, and 4.5 for propane, butane, and pentane, respectively. In the case of LDPE hydrogenolysis over Ru/CeO$_2$, for example, before C—C bond breaking, the polymer undergoes extensive dehydrogenation on the metal through quasi-equilibrated C—H bond-breaking steps. This fact determines the high content of deuterons in the products since they form from deeply dehydrogenated intermediates.

The high probability of 2 deuterons in methane and ethane with a non-random distribution reflects that dehydrogenation of $C_1$-$C_2$ surface species may not be fully equilibrated. In this case, two D atoms are incorporated in methane and ethane after C—C bond breaking.

Figure 20:
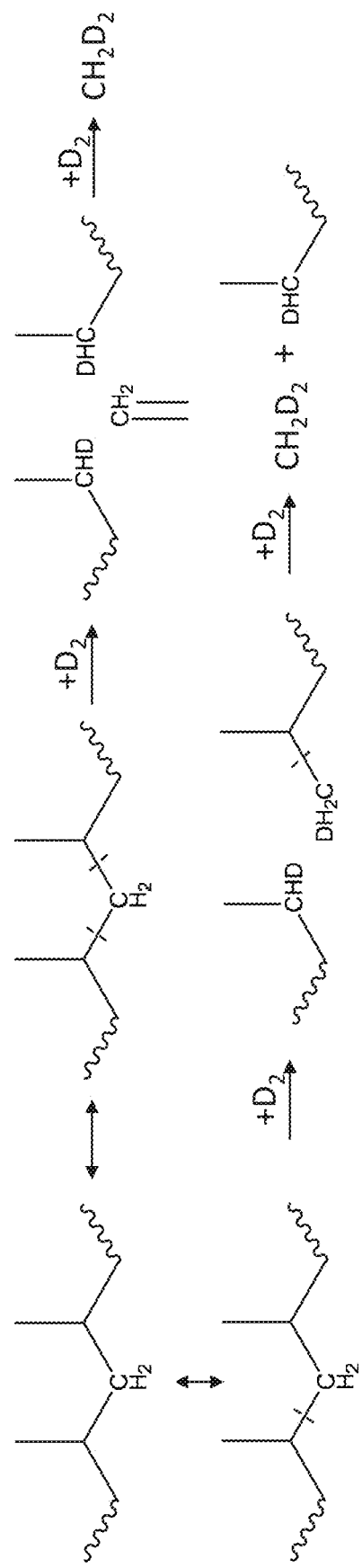
FIG. 20 shows concerted and sequential hydrogenolysis pathways to methane.

FIG. 20 implies the conversion of two CH groups into two $CH_2$ groups without the formation of $CH_3$ groups. The surface-bonded methylene is rapidly hydrogenated to deuterated methane. Surface mediated alkyl and alkylidene species also have a probability of exchanging hydrogen, leading to deviation of the number of deuterons from 2, as expected from FIG. 20.

Figure 9H:
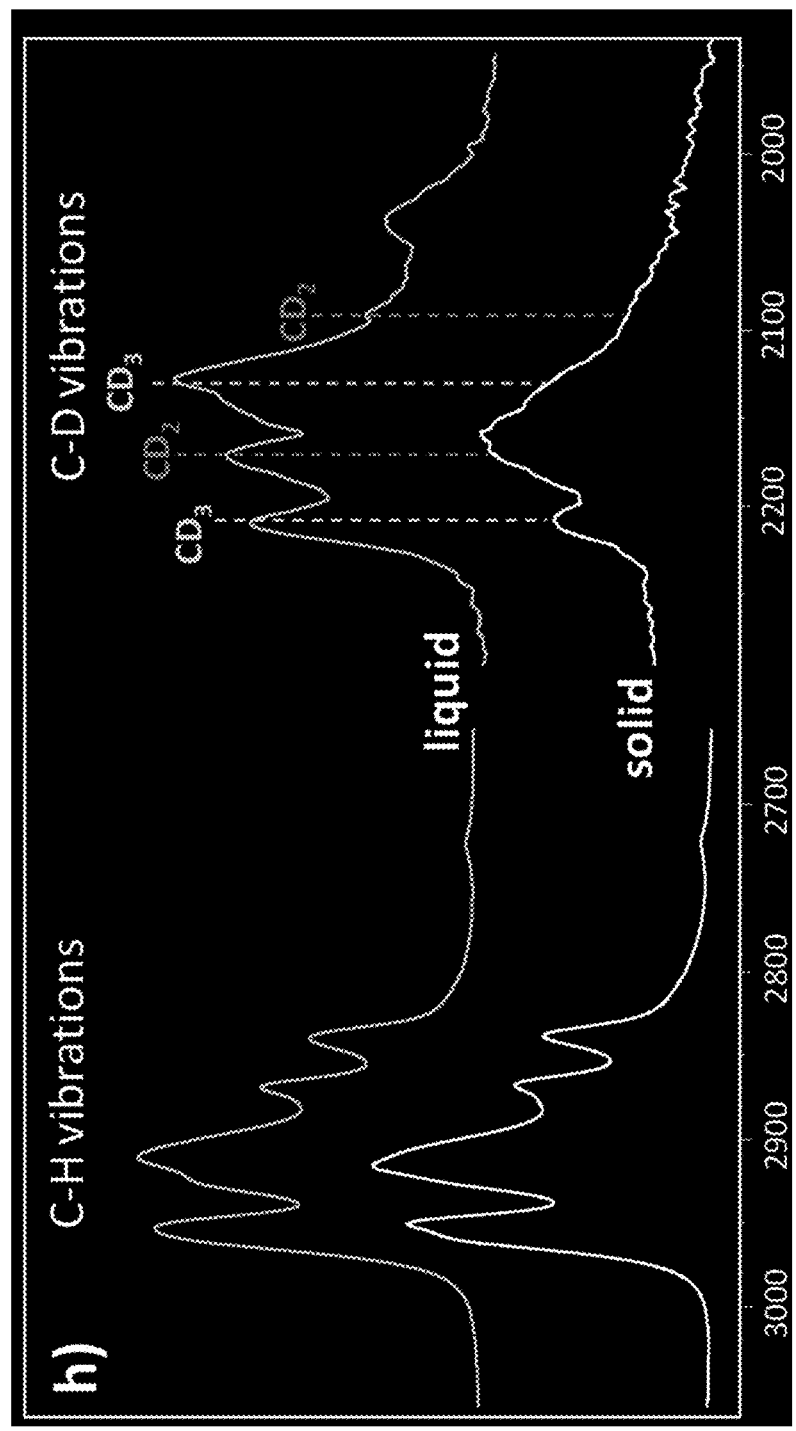
FIG. 9h shows spectra of solid and liquid products after 6 h reaction of i-PP with D$_2$.
Figure 10:
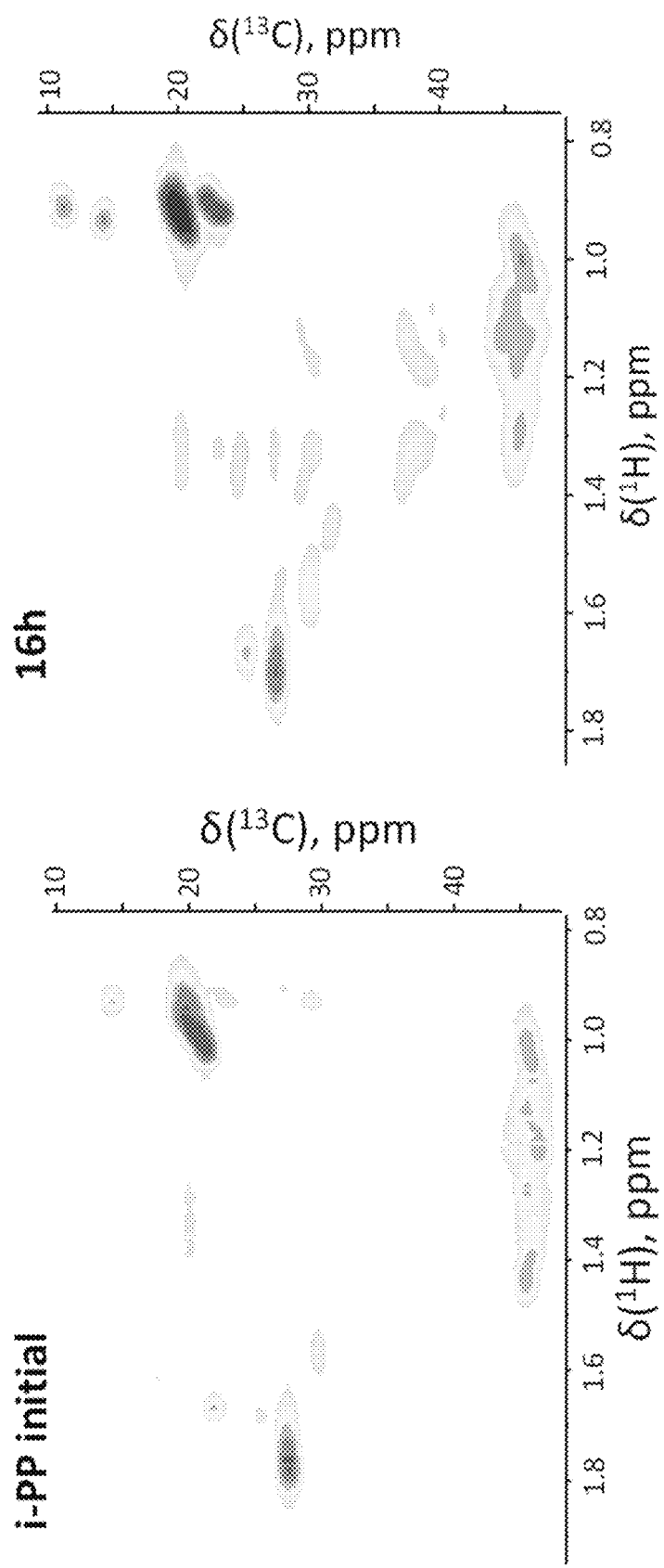
FIG. 10 shows 2D HSQC NMR spectra of the initial i-PP and oil after 16 h of reaction. Solvent toluene-d$_8$; catalyst Ru/TiO$_2$.
Figure 21:
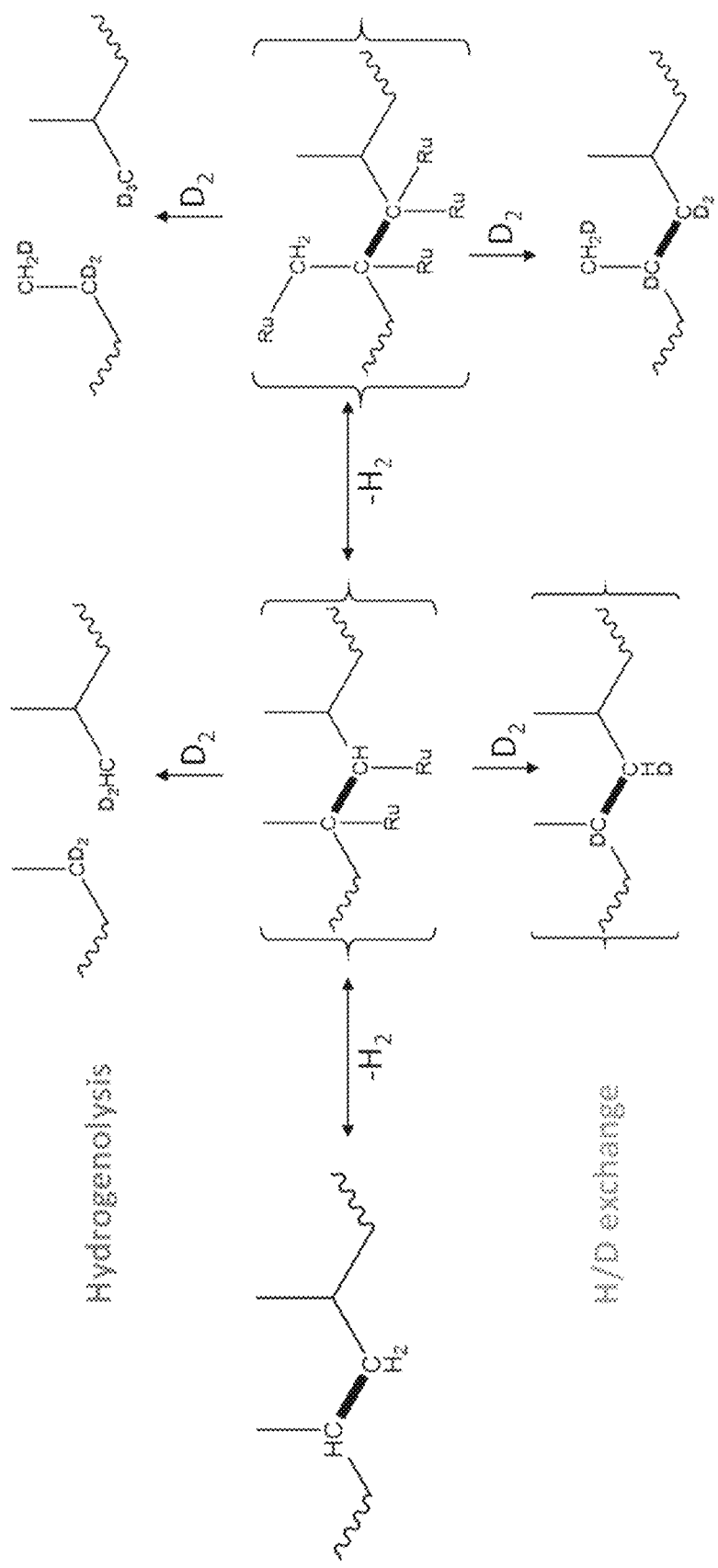
FIG. 21 shows two extreme pathways of D insertion in polypropylene hydrogenolysis and standard H/D exchange.

The ATR-IR spectra of the solid residue are remarkably different from the liquid and gas products (FIG. 9h). The intensity of $CD_3$ stretching and bending vibrations is generally lower than in the liquid. The C—H stretching region in both the oil and solid due to unexchanged groups, on the contrary, is very similar. The distinction in the C-D stretching region is attributed to the less reactive $CH_3$ groups in the solid toward H/D exchange. Deuteration of methyl groups in the solid PP can be kinetically limited due to a high dehydrogenation energy barrier of the $CH_3$ group. The formation of the $CD_3$ group may be directly linked to hydrogenolysis, according to the pathways in FIG. 21. According to FIG. 21, the liquid will inevitably have more deuterons in methyl groups than the solid due to hydrogenolysis.

The i-PP hydrogenolysis initiates with dehydrogenation, similar to small alkanes and LDPE. Unlike other substrates, the PP chain in contact with the surface should involve dehydrogenation of the $CH_3$ group to break C—C bonds in the polymer backbone.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A process for converting plastic comprising a polyolefin polymer to a lubricant, comprising contacting the plastic with a catalyst represented by the Formula (I):

$$A/[R_mQ_n] \qquad (I),$$

at a temperature between about 200° C. and about 400° C.; wherein
A is a metal selected from a group consisting of ruthenium, rhodium, osmium, platinum, palladium, nickel, cobalt, tin, iron, copper, and a combination thereof;
$[R_mQ_n]$ is a supporting material; wherein
R is selected from a group consisting of carbon (C), silicon (Si), aluminum (Al), cerium (Ce), titanium (Ti), tungsten (W), zirconium (Zr), and a combination thereof;
Q is absent or oxygen;
m is 1, 2, or 3;
n is 1, 2, 3, or 4; and
the symbol "/" means that the moiety A is deposited on the moiety $[R_mQ_n]$.

2. The process of claim 1, wherein the plastic comprises a homopolymer of an olefin, a copolymer of olefins, or a mixture thereof.

3. The process of claim 1, wherein the plastic comprises polyethylene, polypropylene, polybutene, polyisobutylene, polypentene, polyhexene, polyoctene, polystyrene, or a mixture thereof.

4. The process of claim 1, wherein the plastic comprises high-density polyethylene (HDPE), low-density polyethylene (LDPE), polypropylene (PP), polystyrene (PS), or a mixture thereof.

5. The process of claim 1, wherein the plastic comprises polypropylene.

6. The process of claim 1, wherein the plastic is selected from the group consisting of isotactic polypropylene, syndiotactic polypropylene, atactic polypropylene, low molecular weight isotactic polypropylene, amorphous polypropylene, polypropylene bottles, polypropylene transparent bags, and a mixture thereof.

7. The process of claim 1, wherein the process is carried out in a hydrogen atmosphere at a pressure between about 20 bar to about 200 bar.

8. The process of claim 1, wherein the temperature is between about 200° C. and about 325° C.

9. The process of claim 1, wherein the process for conversion is carried out for a period of time between about 0.1 hour and about 96 hours.

10. The process of claim 1, wherein the lubricant is a mixture of hydrocarbons having a carbon number distribution between about 13 and about 60.

11. The process of claim 1, wherein the KV40 value of the lubricant is between about 30 and about 115.

12. The process of claim 1, wherein the VI value of the lubricant is between about 139 and about 156.

13. The process of claim 1, wherein the pour point of the lubricant is between about −15° C. and about −18° C.

14. The process of claim 1, wherein the DSC oxidation onset temperature of the lubricant is between about 175° C. and about 179° C.

15. The process of claim 1, wherein the number average molecular weight ($M_n$) of the lubricant is between about 600 and about 3,500.

16. The process of claim 1, wherein the polydispersity index (PDI) of the lubricant is between about 1.3 and about 2.8.

17. The process of claim 1, wherein the viscosity at 100° C. of the lubricant is between about 6.2 and about 42.2.

18. The process of claim 1, wherein the molecular weight of the lubricant is between about 700 and about 800.

19. The process of claim 1, wherein the weight ratio between the plastic and the catalyst is about 200:1 to about 1:1.

20. The process of claim 1, wherein the conversion of the plastics is at least about 70%.

21. The process of claim 1, wherein the yield of the lubricant is at least about 5%.

22. The process of claim 1, wherein A is a metal selected from the group consisting of ruthenium, nickel, and cobalt.

23. The process of claim 1, wherein R is selected from a group consisting of carbon, silicon, aluminum, cerium, and titanium.

24. The process of claim 1, wherein Q is oxygen.

25. The process of claim 1, wherein the weight percentage of the component A is about 0.5% to 100% of the weight of the catalyst.

26. The process of claim 1, wherein the catalyst is selected from a group consisting of $Ru/SiO_2$, Ru/C, $Ru/Al_2O_3$, $Ru/CeO_2$, $Ru/TiO_2$, $Ni/SiO_2$, Ni, $Co/SiO_2$, and a mixture thereof.

27. The process of claim 1, wherein $R_mQ_n$ is a $TiO_2$ nanopowder.

* * * * *